(12) United States Patent
Sanni et al.

(10) Patent No.: US 11,775,904 B1
(45) Date of Patent: Oct. 3, 2023

(54) SYSTEM AND METHOD FOR MANAGING DIGITAL GOVERNANCE IN DIGITAL ECOSYSTEM

(71) Applicants: Christine Nichole Sanni, Casper, WY (US); Ikhelowa Usman Sanni, Casper, WY (US)

(72) Inventors: Christine Nichole Sanni, Casper, WY (US); Ikhelowa Usman Sanni, Casper, WY (US)

(73) Assignee: Sybal Enterprises Inc., Casper, WY (US)

( * ) Notice: Subject to any disclaimer, the term of this patent is extended or adjusted under 35 U.S.C. 154(b) by 0 days.

(21) Appl. No.: 18/116,329

(22) Filed: Mar. 2, 2023

(51) Int. Cl.
*G06Q 10/0635* (2023.01)

(52) U.S. Cl.
CPC ................. *G06Q 10/0635* (2013.01)

(58) Field of Classification Search
CPC .................................................. G06Q 10/0635
See application file for complete search history.

(56) References Cited

U.S. PATENT DOCUMENTS

| 5,208,765 | A  | * | 5/1993  | Turnbull | ............ | G06Q 10/0875 705/29 |
| 9,253,216 | B2 |   | 2/2016  | Lim      |              |                     |
| 9,465,778 | B1 | * | 10/2016 | DeBo     | ............ | G06F 16/21          |
| 10,332,139| B2 | * | 6/2019  | Lanxner  | ............ | G06Q 30/0206        |

(Continued)

FOREIGN PATENT DOCUMENTS

| CN | 114357187   | A  | * | 4/2022  |            |             |
| WO | WO-2018232036| A1| * | 12/2018 | ............ | G06F 16/27  |
| WO | WO-2019119619| A1| * | 6/2019  | ............ | G06Q 10/103 |

OTHER PUBLICATIONS

Ofe et al. "The emergence of digital ecosystem governance:An investigation of responses to disruptedresource control in the Swedish publictransport sector" (2021) (https://onlinelibrary.wiley.com/doi/epdf/10.1111/isj.12404) (Year: 2021).*

(Continued)

*Primary Examiner* — Sujay Koneru
(74) *Attorney, Agent, or Firm* — Dhiraj Jindal; PATENT YOGI LLC

(57) ABSTRACT

A system for managing digital governance in a digital ecosystem is provided. The system includes data repository configured to maintain thereat at least policy library including policies and procedures used by enterprises; and at least one processor, The processor(s) is configured to: receive policy document(s) from policy library, policy document(s) is used by enterprise to which digital ecosystem belongs; receive digital event data indicating behavior of digital participants within digital ecosystem from target server associated with enterprise; generate a violation summary, based on policy document(s) and digital event data, wherein violation(s) is/are recorded when digital event data is non-compliant with policy document(s); determine policy effectiveness score(s), based on violation summary; determine compliance score(s), based on policy effectiveness score(s) determine governance score of digital ecosystem, based on compliance score(s); and communicate governance score to target server, for enabling enterprise in implementing action(s) for maintaining or improving digital governance in digital ecosystem.

18 Claims, 9 Drawing Sheets

(56) References Cited

U.S. PATENT DOCUMENTS

| | | | | |
|---|---|---|---|---|
| 10,666,544 | B1* | 5/2020 | Robinson, Jr. | H04L 45/02 |
| 10,681,072 | B2* | 6/2020 | Alfano | H04L 63/1425 |
| 10,699,226 | B1* | 6/2020 | Lyons | G06Q 10/063114 |
| 2005/0256735 | A1* | 11/2005 | Bayne | G06Q 10/06 705/7.11 |
| 2007/0288247 | A1* | 12/2007 | Mackay | G06Q 10/00 705/325 |
| 2010/0049748 | A1* | 2/2010 | Vanga | G06Q 10/06 705/1.1 |
| 2010/0125911 | A1* | 5/2010 | Bhaskaran | G06Q 10/10 715/781 |
| 2011/0145885 | A1* | 6/2011 | Rivers | G06Q 10/06 726/1 |
| 2011/0162067 | A1* | 6/2011 | Shuart | G06F 21/31 726/19 |
| 2013/0138603 | A1* | 5/2013 | Chilakamarri | G06Q 10/00 707/E17.005 |
| 2014/0331277 | A1* | 11/2014 | Frascadore | G06F 9/45558 726/1 |
| 2015/0019614 | A1* | 1/2015 | Pierre-March | H04L 67/60 709/201 |
| 2015/0244820 | A1 | 8/2015 | Verkasalo et al. | |
| 2017/0287090 | A1 | 10/2017 | Hunn et al. | |
| 2018/0225764 | A1* | 8/2018 | Donia | G06Q 30/018 |
| 2019/0026328 | A1* | 1/2019 | Jin | G06Q 10/0635 |
| 2019/0319980 | A1* | 10/2019 | Levy | H04L 63/1433 |
| 2019/0325407 | A1* | 10/2019 | Zhou | G06Q 20/3274 |
| 2020/0005213 | A1 | 1/2020 | Clemens | |
| 2020/0082302 | A1* | 3/2020 | Zoldi | G06N 5/02 |
| 2020/0143466 | A1* | 5/2020 | Wu | H04L 9/3239 |
| 2020/0210413 | A1* | 7/2020 | Quick | G06Q 20/223 |
| 2021/0297268 | A1* | 9/2021 | Weng | H04L 9/0838 |
| 2022/0066999 | A1* | 3/2022 | Lane | G06F 16/1734 |
| 2022/0100875 | A1* | 3/2022 | Hod | G06F 21/6218 |

OTHER PUBLICATIONS

Public-Private Analytic Exchange Program Topic Team Overviews, Oct. 28, 2022, Homeland Security, https://www.dhs.gov/publication/aep-topic-team-overviews.

David Allessie, Blockchain for digital government, 2019, EU Science Hub, https://joinup.ec.europa.eu/sites/default/files/document/2019-04/JRC115049%20blockchain%20for%20digital%20government.pdf.

Blockchain in Government and the Public Sector, ConsenSys, https://consensys.net/blockchain-use-cases/government-and-the-public-sector/.

* cited by examiner

SYSTEM AND METHOD FOR MANAGING DIGITAL GOVERNANCE IN DIGITAL ECOSYSTEM

FIELD OF THE INVENTION

The present invention generally relates to governance in digital ecosystems, and, more particularly, to a system, a method and a computer program product for managing digital governance in a digital ecosystem.

BACKGROUND OF THE INVENTION

Governance is a set of rules and standards written in the form of policies and procedures that direct and control a system (or a specific domain of the system) with measurement action, and proof of its effectiveness, with an intent to safeguard that system. Digital ecosystems with governances acknowledge the rapid adaptation of digital transformation but users and clients may leverage this rapid growth to carry out malicious actions.

Existing techniques for policy managements are deficient with regard to several aspects. Current technologies do not measure nor enhance effectiveness of policies implemented by digital ecosystems and digital governances. Existing policies of governance associated with employee management, security, privacy, and the like, often become obsolete within a quick span of time (for example, such as three to six months). Therefore, the existing policies for governance require upgradation based on a variety of factors determining effectiveness of operations, incurred losses and realized profits, quality of outcomes, consumer retention and trust, etc. Furthermore, enterprises may face significant fines or receive warnings (for example, be penalized) when there is a failure to implement policies that maintain effective governance. Therefore, digital ecosystems need to validate their policies and measure their policy effectiveness dynamically and continuously to maintain the integrity of their digital ecosystems and establish more trust. Current technologies act as an attestation tool and rely upon the users subjective and therefore bias input of governance to assess risk. This approach falls short, as it introduces bias to risk assessment and fails to prioritize the policy itself as a key element to effective governance through dynamic control. Furthermore, as more and more digital participants like Profiles, Organizations, Nodes, Users, etc. integrate with digital ecosystems, more is a necessity of the proof of effectiveness for digital governances for protecting consumers (i.e., end-clients). Current technologies do not provide an independent and unbiased measurement of governance from the analysis of policy effectiveness where attestation is not present. Moreover, current technologies do not make digital governance immutable and transparent so that clients, authorities, enterprises, etc. may validate and review its policies and policy performance. Furthermore, current solutions do not enable in proactively establishing regulations using insights from the measurement of governance. Therefore, there is a need for improved technology to determine governance in digital ecosystems for facilitating policy recommendations for governances that may overcome one or more of the above-mentioned problems and/or limitations.

SUMMARY OF THE INVENTION

In view of the foregoing disadvantages inherent in the prior art, the general purpose of the present invention is to provide a system, a method and a computer program product for managing digital governance in a digital ecosystem to include all advantages of the prior art, and to overcome the drawbacks inherent in the prior art.

In one aspect of the present invention, a system for managing digital governance in a digital ecosystem is provided. The system includes a data repository and at least one processor communicably coupled to the data repository. The data repository is configured to maintain thereat at least a policy library including policies and procedures used by enterprises. The at least one processor is configured to: receive at least one policy document from the policy library, wherein the at least one policy document is used by an enterprise to which the digital ecosystem belongs; receive digital event data from a target server, wherein the digital event data is indicative of behavior of digital participants within the digital ecosystem, and wherein the target server is associated with the enterprise to which the digital ecosystem belongs; generate a violation summary, based on the at least one policy document and the digital event data, wherein at least one violation is recorded in the violation summary when the digital event data is non-compliant with the at least one policy document; determine at least one policy effectiveness score, based on the violation summary; determine at least one compliance score, based on the at least one policy effectiveness score; determine a governance score of the digital ecosystem, based on the at least one compliance score; and communicate the governance score to the target server, for enabling the enterprise in implementing at least one action for maintaining or improving the digital governance in the digital ecosystem.

In another aspect of the present invention, a method for managing digital governance in a digital ecosystem is provided. The method includes receiving at least one policy document from a policy library that is maintained at a data repository, wherein the policy library includes policies and procedures used by enterprises, and wherein the at least one policy document is used by an enterprise to which the digital ecosystem belongs; receiving digital event data from a target server, wherein the digital event data is indicative of behavior of digital participants within the digital ecosystem, and wherein the target server is associated with the enterprise to which the digital ecosystem belongs; generating a violation summary, based on the at least one policy document and the digital event data, wherein at least one violation is recorded in the violation summary when the digital event data is non-compliant with the at least one policy document; determining at least one policy effectiveness score, based on the violation summary; determining at least one compliance score based on the at least one policy effectiveness score, determining a governance score of the digital ecosystem, based on the at least one compliance score; and communicating the governance score to the target server, for enabling the enterprise in implementing at least one action for maintaining or improving the digital governance in the digital ecosystem.

In yet another aspect of the invention, a computer program product is provided. The computer program product includes a non-transitory machine-readable data storage medium having stored thereon program instructions. The program instructions, when accessed by a processing device, cause the processing device to: receive at least one policy document from a policy library that is maintained at a data repository, wherein the policy library includes policies and procedures used by enterprises, and wherein the at least one policy document is used by an enterprise to which the digital ecosystem belongs; receive digital event data from a target server, wherein the digital event data is indicative of behavior of digital participants within the digital ecosystem, and wherein the target server is associated with the enterprise to which the digital ecosystem belongs; generate a violation summary, based on the at least one policy document and the digital event data, wherein at least one violation is recorded in the violation summary when the digital event data is non-compliant with the at least one policy document; determine at least one policy effectiveness score, based on the violation summary; determine at least one compliance score, based on the at least one policy effectiveness score, determine a governance score of the digital ecosystem, based on the at least one compliance score; and communicate the governance score to the target server, for enabling the enterprise in implementing at least one action for maintaining or improving the digital governance in the digital ecosystem.

This together with the other aspects of the present invention, along with the various features of novelty that characterize the present invention, is pointed out with particularity in the claims annexed hereto and forms a part of the present invention. For a better understanding of the present invention, its operating advantages, and the specified object attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like components throughout the detailed description of the invention in conjunction with drawings.

DETAILED DESCRIPTION OF THE INVENTION

Figure 1:
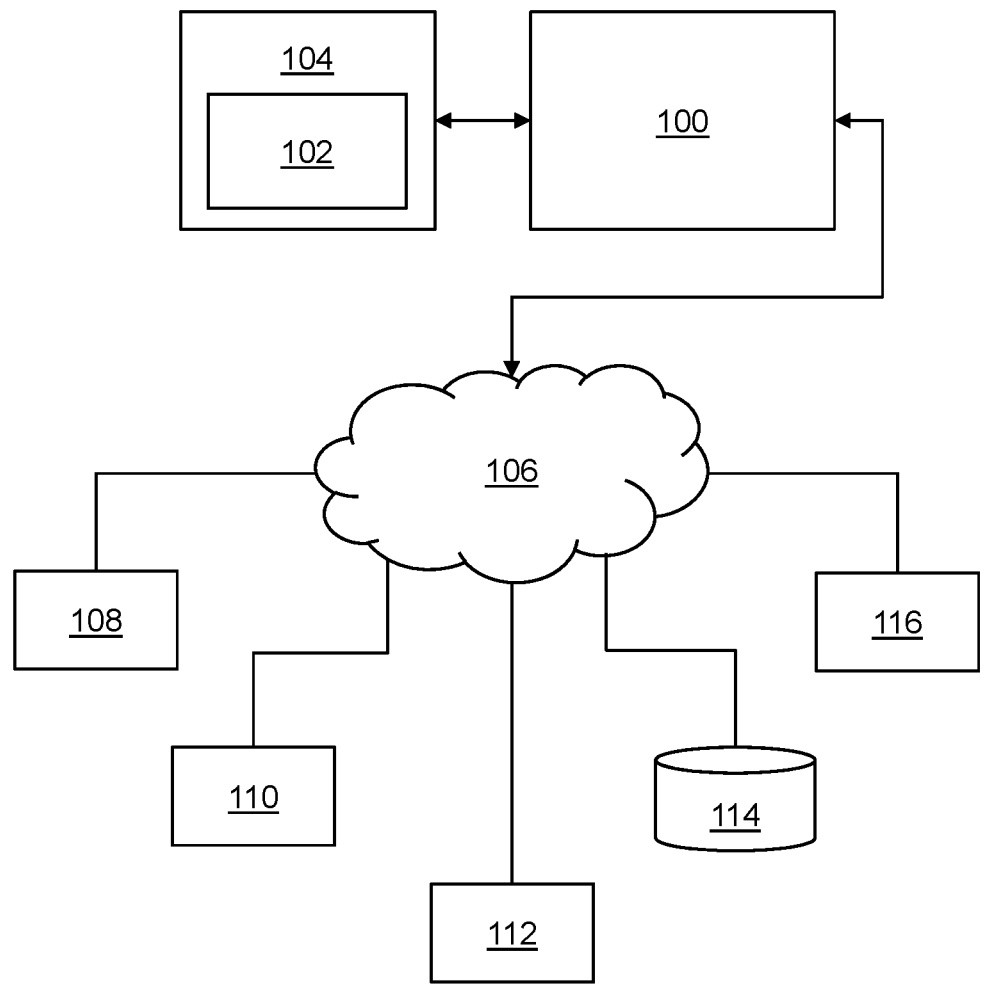
FIG. 1 illustrates an environment in which a system for managing digital governance in a digital ecosystem is implemented, in accordance with an embodiment of the present invention.

For a thorough understanding of the present invention, reference is to be made to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The terms, "a" and "an" herein do not denote a limitation of quantity, but rather denote the presence of at least one of the referenced items.

The present invention provides a system for managing digital governance in a digital ecosystem. The system includes a data repository and at least one processor communicably coupled to the data repository. The data repository is configured to maintain thereat at least a policy library including policies and procedures used by enterprises. The at least one processor is configured to: receive at least one policy document from the policy library, wherein the at least one policy document is used by an enterprise to which the digital ecosystem belongs; receive digital event data from a target server, wherein the digital event data is indicative of behavior of digital participants within the digital ecosystem, and wherein the target server is associated with the enterprise to which the digital ecosystem belongs; generate a violation summary, based on the at least one policy document and the digital event data, wherein at least one violation is recorded in the violation summary when the digital event data is non-compliant with the at least one policy document; determine at least one policy effectiveness score, based on the violation summary; determine at least one compliance score, based on the at least one policy effectiveness score; determine a governance score of the digital ecosystem, based on the at least one compliance score; and communicate the governance score to the target server, for enabling the enterprise in implementing at least one action for maintaining or improving the digital governance in the digital ecosystem.

The present invention also provides a method for managing digital governance in a digital ecosystem. The method includes receiving at least one policy document from a policy library that is maintained at a data repository, wherein the policy library includes policies and procedures used by enterprises, and wherein the at least one policy document is used by an enterprise to which the digital ecosystem belongs; receiving digital event data from a target server, wherein the digital event data is indicative of behavior of digital participants within the digital ecosystem, and wherein the target server is associated with the enterprise to which the digital ecosystem belongs; generating a violation summary, based on the at least one policy document and the digital event data, wherein at least one violation is recorded in the violation summary when the digital event data is non-compliant with the at least one policy document; determining at least one policy effectiveness score, based on the violation summary; determining at least one compliance score, based on the at least one policy effectiveness score; determining a governance score of the digital ecosystem, based on the at least one compliance score; and communicating the governance score to the target server, for enabling the enterprise in implementing at least one action for maintaining or improving the digital governance in the digital ecosystem.

The present invention further provides a computer program product. The computer program product includes a non-transitory machine-readable data storage medium having stored thereon program instructions. The program instructions, when accessed by a processing device, cause the processing device to: receive at least one policy document from a policy library that is maintained at a data repository, wherein the policy library includes policies and procedures used by enterprises, and wherein the at least one policy document is used by an enterprise to which the digital ecosystem belongs; receive digital event data from a target server, wherein the digital event data is indicative of behavior of digital participants within the digital ecosystem, and wherein the target server is associated with the enterprise to which the digital ecosystem belongs; generate a violation summary, based on the at least one policy document and the digital event data, wherein at least one violation is recorded in the violation summary when the digital event data is non-compliant with the at least one policy document; determine at least one policy effectiveness score, based on the violation summary; determine at least one compliance score, based on the at least one policy effectiveness score; determine a governance score of the digital ecosystem, based on the at least one compliance score; and communicate the governance score to the target server, for enabling the enterprise in implementing at least one action for maintaining or improving the digital governance in the digital ecosystem.

Referring to FIG. 1, illustrated is an environment in which a system 100 for managing digital governance in a digital ecosystem is implemented, in accordance with an embodiment of the present invention. The environment includes a target server 102 associated with an enterprise 104, wherein the target server 102 is communicably coupled to the system 100. At least one processor (not shown) of the system 100 optionally hosts a platform for managing digital governance in the digital ecosystem. The system 100 is communicably coupled via a communication network 106 with one or more network entities, such as, for example, a mobile device 108 (such as a smartphone, a laptop, a tablet computer, etc.), other electronic devices 110 and 112 (such as desktop computers, server computers, etc.), a database 114, a sensor 116, actuators (not shown). The enterprise 104 is a customer of the system 100 for which digital governance is to be managed. A user of the system 100 may include one or more relevant parties such as a system administrator of the system 100, an end-user (i.e., a customer of the entity), an auditor, a third party, or similar. The enterprise 104 and/or the user of the system 100 may access the platform through a web-based software application or browser. The web-based software application may be embodied as, for example, but not limited to, a website, a web application, a desktop application, and a mobile application compatible with the system 100. Examples of the communication network 106 include, but are not limited to, the Internet, a radio-based network, a local area network (LAN), a metropolitan area network (MAN), a wide area network (WAN), a wireless network, and a wired network.

Figure 2A:
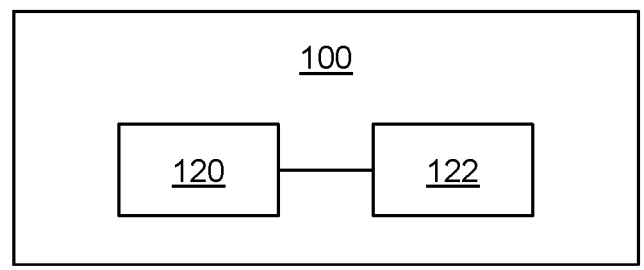
FIGS. 2A and 2B illustrate block diagrams of the system, in accordance with different embodiments of the present invention.
Figure 2B:
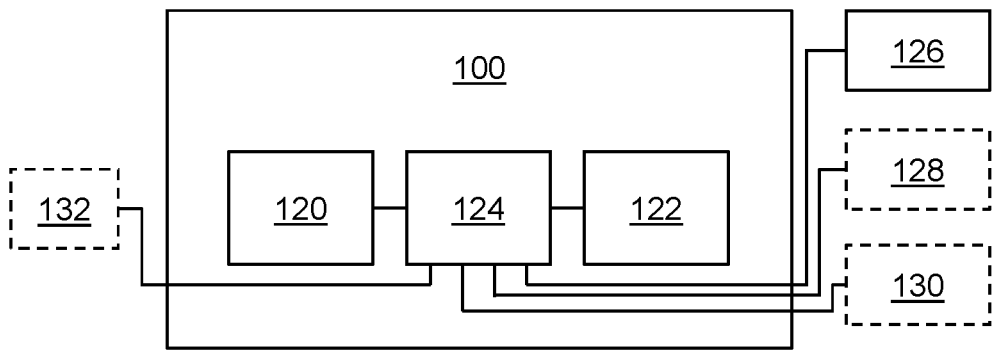

Referring to FIGS. 2A and 2B, illustrated are block diagrams of the system 100, in accordance with different embodiments of the present invention. FIG. 2A illustrates a simplified block diagram of the system 100 whereas FIG. 2B illustrates a detailed block diagram of the system 100 and its coupling with other devices. As shown in FIGS. 2A and 2B, the system 100 comprises a data repository 120 and at least one processor (depicted as a processor 122) communicably coupled to the data repository 120. In FIG. 2B, the system 100 is shown to also comprise a communication device 124, wherein the data repository 120 and the at least one processor 122 are communicably coupled to the communication device 124 and communicate with each other, as well as with all other devices via the communication device 124. In this regard, the communication device 124 is communicably coupled, for example, to target servers of enterprises (depicted as three target servers 126, 128, and 130), and optionally also to a server 132 of at least one regulatory authority. The at least one processor 122, and in particular, the communication device 124, is communicably coupled to at least the target server 126 of the enterprise 104 to which the digital ecosystem belongs. The target server 126 can be understood to be a client device with respect to the at least one processor 122 as the enterprise 104 to which it belongs is a customer of the system 100. It will be appreciated that one or more enterprises may utilize the system 100 for managing digital governance on digital ecosystems that they own, and thus their target servers are communicably coupled to the at least one processor 122 (and in particular, to the at least one communication device 124). In some implementations, the communication device 124 is integrated with the at least one processor 122 whereas in other implementations, the communication device 124 is separate from the at least one processor 122.

The system 100 manages a governance lifecycle of the digital ecosystem. This governance lifecycle may be known as a proof of governance lifecycle. The governance lifecycle is managed to manage the digital governance in the digital ecosystem, and enables in building trust between the (governed) digital ecosystem of the enterprise 104 and the digital participants of the (governed) digital ecosystem. For the system 100 to be able to manage the digital governance in the digital ecosystem, it is imperative that the enterprise 104 has governance applied to the digital ecosystem in the form of at least one policy. The at least one policy must be in digital form and is metadata may be generated from its recordation and digital properties. The process of digitizing policies includes ingesting the policies into a single database (such as the policy library) and processing them in a way that policy document(s) including the policies are readable and congruent with measurable features for analysis. It will be appreciated that the measurable features vary by domain, vertical, digital ecosystem, enterprise, or similar. Existing governance that is applied to the digital ecosystem may establish basic parameters or a base line for acceptable behavior across the digital ecosystem. Subsequently, the base line parameters may establish binary flags for what is or is not acceptable with reason codes.

The "governance" is, for example, a set of rules, guidelines, recommendations, standards, and the like, that are written in the form of policies and procedures that direct and control a domain of the enterprise 104 with measurement, action, and proof of its effectiveness. "Digital governance" simply means that governance is digitally applicable and measurable. The terms "governance" and "digital governance" have the same meaning and may be used interchangeably within the present disclosure. The phrase "managing the digital governance in the digital ecosystem" encompasses at least one of: determining a level of governance in the digital ecosystem, establishing a proof of governance in the digital ecosystem, establishing records of governance decisions with respect to the digital ecosystem, recommending actions for maintaining or improving the digital governance in the digital ecosystem, controlling the digital governance in the digital ecosystem, and the like. The system 100 and method for managing the digital governance in the digital ecosystem, as described herein, involve cyclical and continuous processing steps which are conducted by an independent authority (i.e., an authority that owns the system 100) which is unbiased and external to the enterprise 104.

The data repository 120 is configured to maintain thereat at least a policy library including policies and procedures used by enterprises. The term "data repository" refers to hardware, software, firmware, or a combination of these for storing a given information in an organized (namely, structured) manner, thereby, allowing for easy storage, access (namely, retrieval), updating and analysis of the given information. The data repository 120 may be implemented as a memory of a device (such as the at least one processor 122, or similar), a removable memory, a cloud-based memory, or similar. The data repository 120 can be implemented using one or more storage devices.

Optionally, the data repository 120 is communicably coupled to the target servers (126, 128, and 130) associated with the enterprises, wherein the data 120 repository is configured to obtain the policies and procedures used by the enterprises from the target servers (126, 128, and 130) and store the policies and procedures in the form of the policy library. It will be appreciated that any enterprise, such as the enterprise 104, may regularly or intermittently amend its existing policies, add new policies, remove one or more of its existing policies, or similar. The data repository 120 is automatically sent information of such policy changes by the target server 126 of the enterprise 104 or the data repository 120 prompts the target server 126 of the enterprise 104 periodically or intermittently to update itself of such policy changes.

Optionally, the policy library comprises one or more policy documents used by one or more enterprises. Optionally, in this regard, the policy library comprises at least all policy document(s) used by the enterprise 104 to which the digital ecosystem belongs. The policy library is a digital database maintained by the data repository 120 for storing the one or more policy documents used by the one or more enterprises. Any enterprise uses one or more policies to guide its compliance. A policy may be understood to be a single-page or multi-page document that sets rules and guidelines for behavior in the digital ecosystem. This "behavior" refers to actions of the digital participants in the digital ecosystem. The policy may have its own guides, review models, implementation programs, etc. The policy may govern interactions between the digital participants and the target server 126. The digital participants may utilize the target server 126 for services, administration, governance, etc. Optionally, at least one policy used by the enterprise 104 is derived from at least one regulation and/or at least one statute set by industries for the enterprises. The industries could be in a same domain as the enterprise 104, or could be in a different domain from the enterprise 104.

A "target server" is a server of an enterprise to which the digital ecosystem belongs. The digital participants engage in events in the digital ecosystem. A "digital participant" is any entity that generates the event data in the digital ecosystem. The digital participants are capable of interacting with and/or within the digital ecosystem. Examples of the digital participants include, but are not limited to, digital end-users, profiles of digital end-users, digital entities (i.e., digital organizations), digital transactions, Internet-of-Things (IoT) devices, a person using a digital entity that generates event data, and nodes. The behavior of the digital participants may be normal (i.e., indicative of adherence to digital governance) or abnormal (i.e., indicative of non-compliance of digital governance). Abnormal digital participant behavior is an anomaly and may optionally initiate establishment of a proof of governance within the digital ecosystem.

The term "processor" refers to hardware, software, firmware, or a combination of these, that is configured to perform specialized processing tasks for managing the digital governance in the digital ecosystem. The at least one processor 122 is communicably coupled to the data repository 120 and at least the target server 126. Such communicable coupling is via the communication device 124 which may or may not be integrated with the at least one processor 122. The at least one processor 122 is configured to receive at least one policy document from the policy library, wherein the at least one policy document is used by the enterprise 104 to which the digital ecosystem belongs; receive digital event data from the target server 126, wherein the digital event data is indicative of behavior of digital participants within the digital ecosystem, and wherein the target server 126 is associated with the enterprise 104 to which the digital ecosystem belongs; generate a violation summary, based on the at least one policy document and the digital event data, wherein at least one violation is recorded in the violation summary when the digital event data is non-compliant with the at least one policy document; determine at least one policy effectiveness score, based on the violation summary; determine at least one compliance score, based on the at least one policy effectiveness score; determine a governance score of the digital ecosystem, based on the at least one compliance score; and communicate the governance score to the target server 126, for enabling the enterprise 104 in implementing at least one action for maintaining or improving governance in the digital ecosystem. Each of these processing steps will be explained in detail as follows.

Optionally, the at least one processor 122 receives the at least one policy document from the policy library in real time or in near-real time. This ensures that the at least one processor 122 is always up-to-date with latest policies of the enterprise 104. Optionally, the at least one policy document is in form of at least one of: a text document, a spreadsheet, a transcript of a verbal communication, an image, a video, an audio-video, an audio. The at least one policy document could be in any form that is capable of being processed by the at least one processor 122. In an embodiment, the at least one policy document is created by the enterprise 104 in physical form, wherein a device associated with the enterprise 104 is configured to or utilized to digitize the at least one policy document that is in the physical form to obtain the at least one policy document in digital form. Such digitization is performed by manual typing of contents of the physical form of the at least one policy document, using scanning of physical objects (such as documents, posters, etc.), character recognition from images, and similar. The at least one policy document that is in digital form is shared with the data repository 120. In another embodiment, the at least one policy document is generated in digital form. In this regard, the at least one policy document is generated by a device associated with the enterprise 104. With reference to any of these embodiments, the device associated with the enterprise 104 may, for example, be a computing device (such as a desktop computer, a laptop computer, a server, and the like). The at least one policy document includes at least one policy used by the enterprise 104, wherein a given policy is one of: a fixed policy, a dynamic policy. Fixed policies and dynamic policies are discussed in more detail later.

Optionally, the at least one processor 122 receives the digital event data from the target server 126 in real time or in near-real time. The term "digital event" refers to outcomes of transactions that occur within the digital ecosystem. These transactions may be monetary transactions or non-monetary transactions. Furthermore, these transactions may be quantifiable or non-quantifiable. The digital event data may also be understood to be transactional data. It will be appreciated that digital events that occur in the digital ecosystem must be recorded and captured digitally to analyze the behavior of the digital participants in real-time and/or historically to understand its relation to the at least one policy of the enterprise 104. The digital event data may be in form of one or more of numeric data, text data, image data, transaction logs, cookie data, and the like. When establishing Proof of governance in any domain, area of a business, there may be instances where the digital ecosystem or the enterprise 104 does not capture necessary digital events. In this case, it is possible to identify gaps and areas where governance effectiveness(wellness) requires improvement and proof using the system 100 as digital event data for such instances would not be available. Optionally, when a portion or an entirety of the digital event data is unavailable, the at least one processor 122 is configured to flag such a gap in measurement and communicate the flagging to the target server 126 of the enterprise 104.

The at least one processor 122 generates the violation summary, based on the at least one policy document and the digital event data. For generating the violation summary, the at least one processor 122 digitally analyses the behavior of the digital participants with respect to the policies in the at least one policy document. In case the behavior of the digital participants is fully compliant with the policies in the at least one policy document, no violation is recorded in the violation summary. Alternatively, in case the behavior of the digital participants is partially compliant or totally non-compliant with the policies in the at least one policy document, the at least one violation is recorded in the violation summary. Optionally, the at least one violation is at least one of: a partial violation, a full violation. Recording of the at least one violation is described in more detail hereinbelow.

Figure 3:
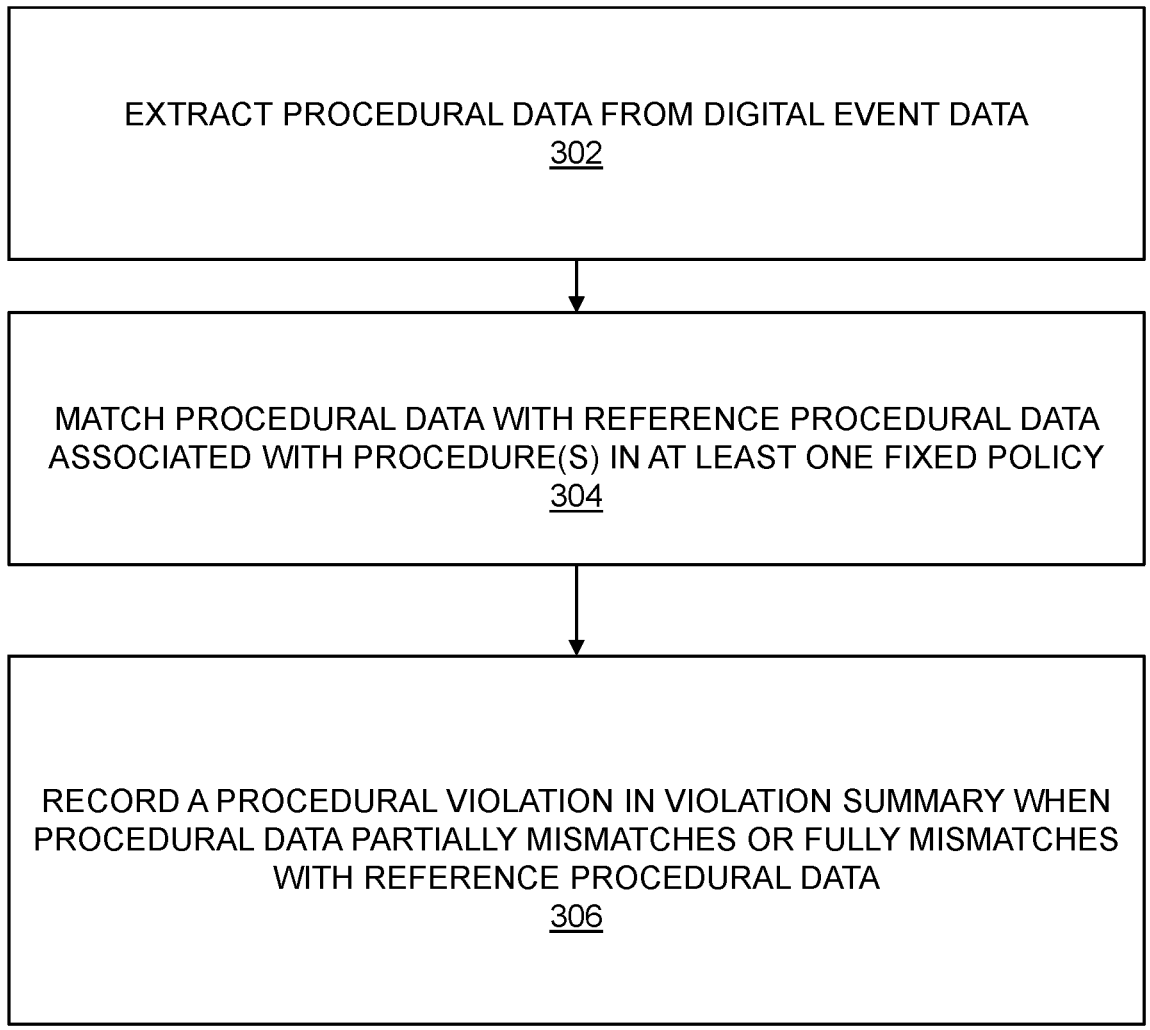
FIG. 3 illustrates a process flow for recording procedural violations, in accordance with an embodiment of the present invention.

Referring to FIG. 3, illustrated is a process flow for recording procedural violations, in accordance with an embodiment of the present invention. In an embodiment, the at least one policy document includes at least one fixed policy, the at least one fixed policy being associated with one or more procedures, wherein when generating the violation summary, the at least one processor 122 is configured to: extract (at 302) procedural data from the digital event data; match (at 304) the procedural data with reference procedural data associated with the one or more procedures in the at least one fixed policy; and record (at 306) a given violation in the violation summary when the procedural data partially mismatches or fully mismatches with the reference procedural data, the given violation being a procedural violation.

Herein, the term "fixed policy" refers to a policy that does not have quantifiable parameters within itself. Typically, fixed policies are unique to their corresponding digital ecosystems/enterprises, and thus have minimal and infrequent edits, reviews, and/or measurements. A fixed policy is often written under the guidance of a set of regulatory frameworks that the digital ecosystem/the enterprise 104 must be in compliance with. The at least one fixed policy is often used to monitor non-quantifiable events. The term "procedures" refers to a series of recordable actions taken to ensure the digital ecosystem/the enterprise 104 is in compliance with its policies. The procedural data in the digital event data is actual data captured for the digital ecosystem, and may include at least one of actual procedural steps that are followed by the digital participants, sequence(s) of the actual procedural steps, a number of the actual procedural steps, actual outcomes of the actual procedural steps, actual inputs provided for the actual procedural steps, and the like. The reference procedural data may include at least one of, but is not limited to, prescribed procedural steps required to be followed, prescribed sequence(s) of the actual procedural steps, a prescribed number of the actual procedural steps, expected outcomes of the prescribed procedural steps required to be followed, and expected inputs to be provided for the prescribed procedural steps. By way of matching the procedural data with the reference procedural data, the at least one processor 122 reviews each fixed policy and its procedures against the procedural data from the digital event data to perform a procedure assessment and discover any full/partial procedural violation.

Figure 4:
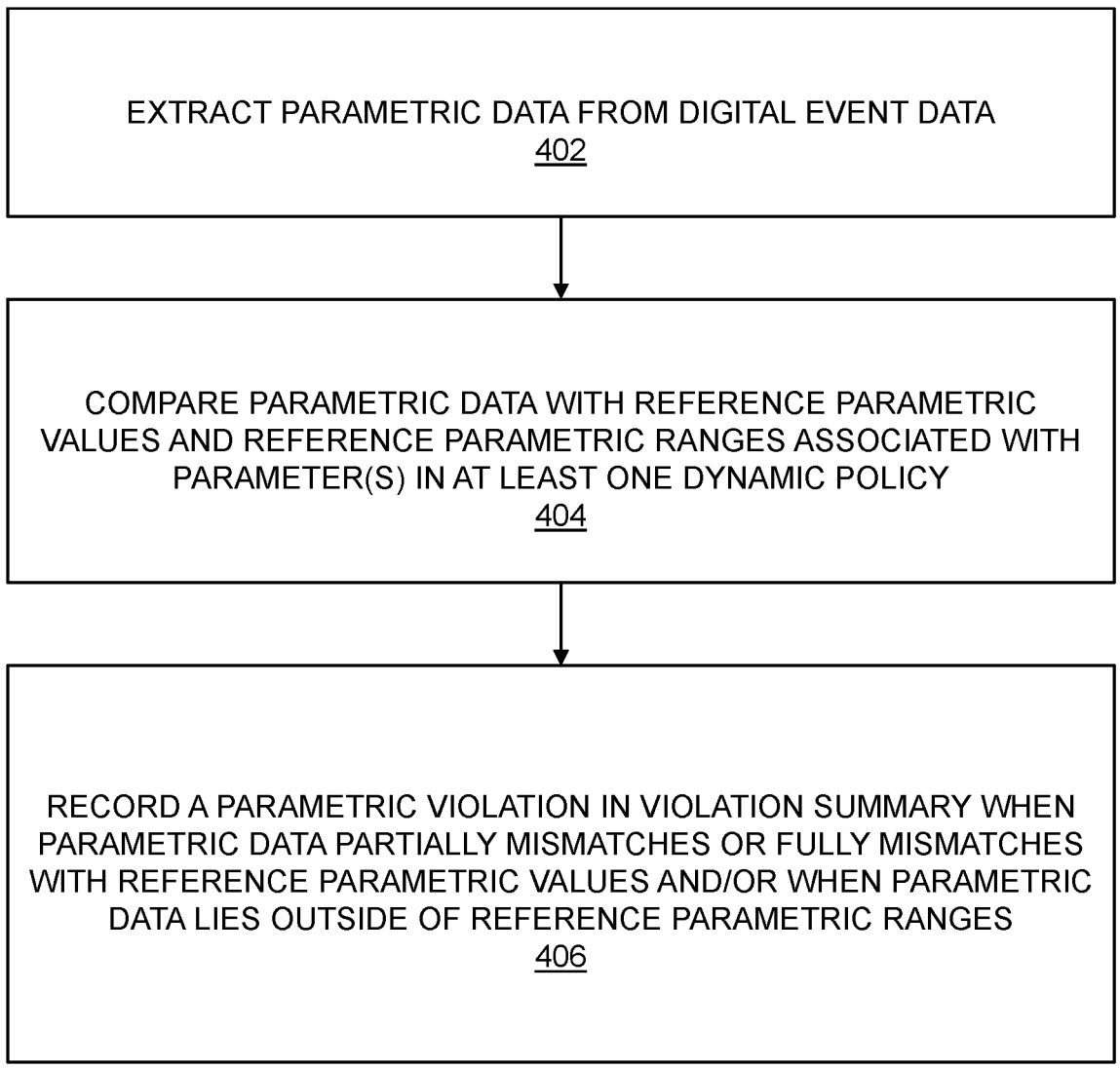
FIG. 4 illustrates a process flow for recording parametric violations, in accordance with an embodiment of the present invention.

Referring to FIG. 4, illustrated is a process flow for recording parametric violations, in accordance with an embodiment of the present invention. In an embodiment, the at least one policy document includes at least one dynamic policy, the at least one dynamic policy being associated with one or more parameters, and wherein when generating the violation summary, the at least one processor 122 is configured to: extract (at 402) parametric data from the digital event data; compare (at 404) the parametric data with reference parametric values and reference parametric ranges associated with the one or more parameters in the at least one dynamic policy; and record (at 406) a given violation in the violation summary when the parametric data partially mismatches or fully mismatches with the reference parametric values and/or when the parametric data lies outside of the reference parametric ranges, the given violation being a parametric violation.

Herein, the term "dynamic policy" refers to a policy that has measurable (i.e., quantifiable) parameters within itself. A dynamic policy may also have one or more of: predefined thresholds, measurements, key performance indicators (KPIs), and similar. Dynamic policies may have frequent edits, reviews as having both measurable parameters, predefined thresholds, and/or measurements. Dynamic policies are often written by the digital ecosystems/the enterprises themselves to help monitor quantifiable events, such as transactions or KPIs. A dynamic policy is associated with one or more sets of parameters. The term "parameter" refers to a measurable factor that indicates conditions of operation of the digital ecosystem. The one or more sets of parameters in the dynamic policy vary from policy to policy, from domain to domain, and from digital ecosystem to digital ecosystem.

The parametric data in the digital event data is actual data captured for the digital ecosystem, and may include at least one of actual values of parameters that are employed by the digital participants, actual ranges of values of parameters that are employed by the digital participants, actual number of parameters that are employed in the digital ecosystem, and the like. The reference parametric values and reference parametric ranges associated with the one or more parameters in the at least one dynamic policy may include at least one of, but are not limited to, expected values of parameters that are employed by the digital participants, expected ranges of values of parameters that are employed by the digital participants, and expected number of parameters to be employed in the digital ecosystem. By way of comparing the parametric data with reference parametric values and reference parametric ranges, the at least one processor 122 reviews each dynamic policy and its parameters against the parametric data from the digital event data to perform a parametric assessment and discover any full/partial parametric violation. In the parametric assessment, it is determined if digital events are within their parameters set by the at least one dynamic policy. Only when the parametric data fully matches with the reference parametric values and/or when the parametric data lies within the reference parametric ranges, is it determined that no parametric violation has occurred.

It will be appreciated that a digital event can be guided by multiple policies (i.e., by multiple fixed policies, by multiple dynamic policies, or by at least one fixed policy and at least one dynamic policy). Therefore, when such a digital event is non-compliant with the at least one policy used by the enterprise 104, the digital event may be flagged multiple times and may give rise to multiple violations. These multiple violations would be recorded in the violation summary.

The at least one processor 122 determines the at least one policy effectiveness score, based on the violation summary. The "policy effectiveness score" is a measurable quantity which is indicative of how well the policy is being implemented in the digital ecosystem. A policy effectiveness score for a given policy is high when a number of violations and an extent of violations of the given policy, as recorded in the violation summary, are less. Conversely, when the number of violations and the extent of violations of the given policy are high, the policy effectiveness score for the given policy is low. When the policy effectiveness score for the given policy is low, it indicates that a level of digital governance in a corresponding digital ecosystem is low (i.e., poor), and vice versa. Low policy effectiveness scores mean that despite the enterprise 104 setting policies in place with respect to the digital ecosystem, the behavior of the digital participants in the digital ecosystem flouts the policies. The determination of the at least one policy effectiveness score is made by employing at least one of: a mathematical formula, a computing algorithm. When the digital participants' behavior triggers anomaly detection, the system 100's multi-model network will compute and learn from these anomalies to analyze their proximity to existing governance parameters. From this analysis, a multi-model network-ethical artificial intelligence (AI) optionally measures policy effectiveness. The system 100's multi-model network is executed/implemented by the at least one processor 122. It will be appreciated that the multi-model network of the system 100 includes a processing model that employs mathematical formula(s) and/or computing algorithm(s) to perform analysis of the event data and compute (i.e., measure) values/scores based on said analysis, and an AI model that learns from the at least one policy effectiveness score, the at least one compliance score, and the governance score to optionally make recommendations, predictions, and similar.

The processing model is also capable of performing other processing tasks that are non-AI based. The determination of the at least one policy effectiveness score, the at least one compliance score, and the governance score is made by the processing model executed by the at least one processor 122. Determination of the at least one policy effectiveness score for different types of violations is described in more detail as hereinbelow.

Figure 5:
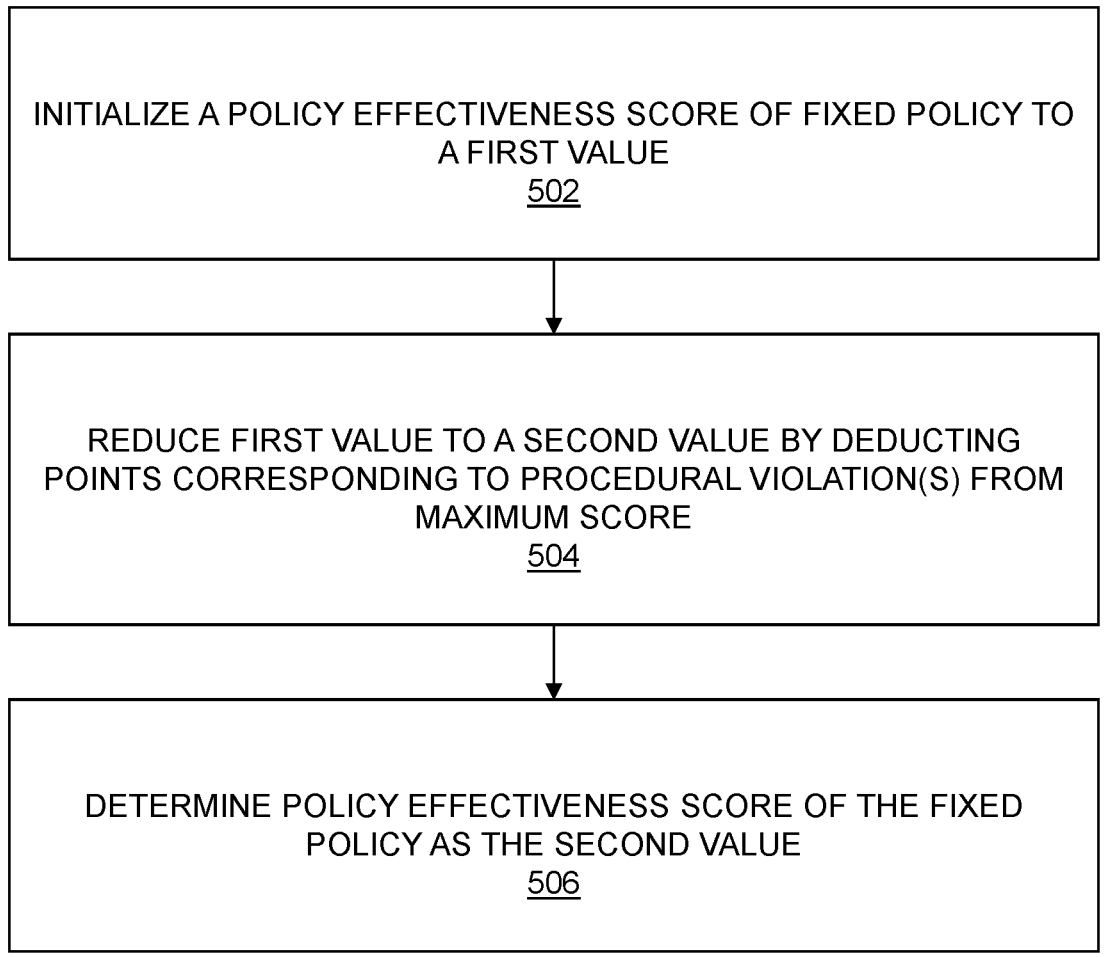
FIG. 5 illustrates a process flow for determining at least one policy effectiveness score for at least one procedural violation, in accordance with an embodiment of the present invention.

Referring to FIG. 5, illustrated is a process flow for determining the at least one policy effectiveness score for the at least one procedural violation, in accordance with an embodiment of the present invention. In an embodiment, the at least one violation in the violation summary is at least one procedural violation of a fixed policy, and wherein when determining the at least one policy effectiveness score, the at least one processor 122 is configured to: initialize (at 502) a policy effectiveness score of the fixed policy to a first value, wherein the first value is a maximum score representing a whole; reduce (at 504) the first value to a second value by deducting points corresponding to the at least one procedural violation from the maximum score; and determine (at 506) the policy effectiveness score of the fixed policy as the second value.

In this regard, the policy effectiveness score of the fixed policy can be initialized according to any suitable scale. For example, the scale of measuring the policy effectiveness score of the fixed policy could be 0 to 1, 0 to 10, 0 to 100, 0 to 1000, 0 to 100% or similar. In such an example, the maximum score representing the whole is 1, 10, 100, 100, 100% or similar. Optionally, each procedure in the at least one fixed policy is worth a given number of points, the given number of points being equal to a total number of procedures in the at least one fixed policy divided by the maximum score representing the whole. Optionally, when reducing the first value to the second value, a number of points that are deducted corresponding to the at least one procedural violation from the maximum score depends on an extent of the at least one procedural violation. In this regard, when a full procedural violation of a given procedure occurs, all points that the given procedure is worth are deducted from the first value. Furthermore, when a partial procedural violation of the given procedure occurs, half of the points that the given procedure is worth are deducted from the first value. It will be appreciated that such a scoring system and gamification of procedure adherence allows the system 100 (and in particular, the at least one processor 122) to accurately evaluate and measure the effectiveness of fixed policy(-ies) within a domain of the enterprise 104 and also to aggregate policy effectiveness scores across the entire digital ecosystem and the enterprise 104.

Let us consider, for example, that the maximum score representing the whole may be 100, and a total of 10 procedures may be specified in a given fixed policy. In an example, when full procedural violation of 2 procedures out of the 10 procedures occurs, the first value (equal to 100) is reduced by 20 points (10 points each for the 2 procedures) to the second value equal to 80. In such a case, a policy effectiveness score of the given fixed policy is equal to 80. In another example, when full procedural violation of 2 procedures and partial procedural violation of 1 procedure out of the 10 procedures occurs, the first value (equal to 100) is reduced by 25 points (10 points each for the 2 procedures and 5 points for the 1 procedure) to the second value equal to 75. In such a case, a policy effectiveness score of the given fixed policy is equal to 75.

Figure 6:
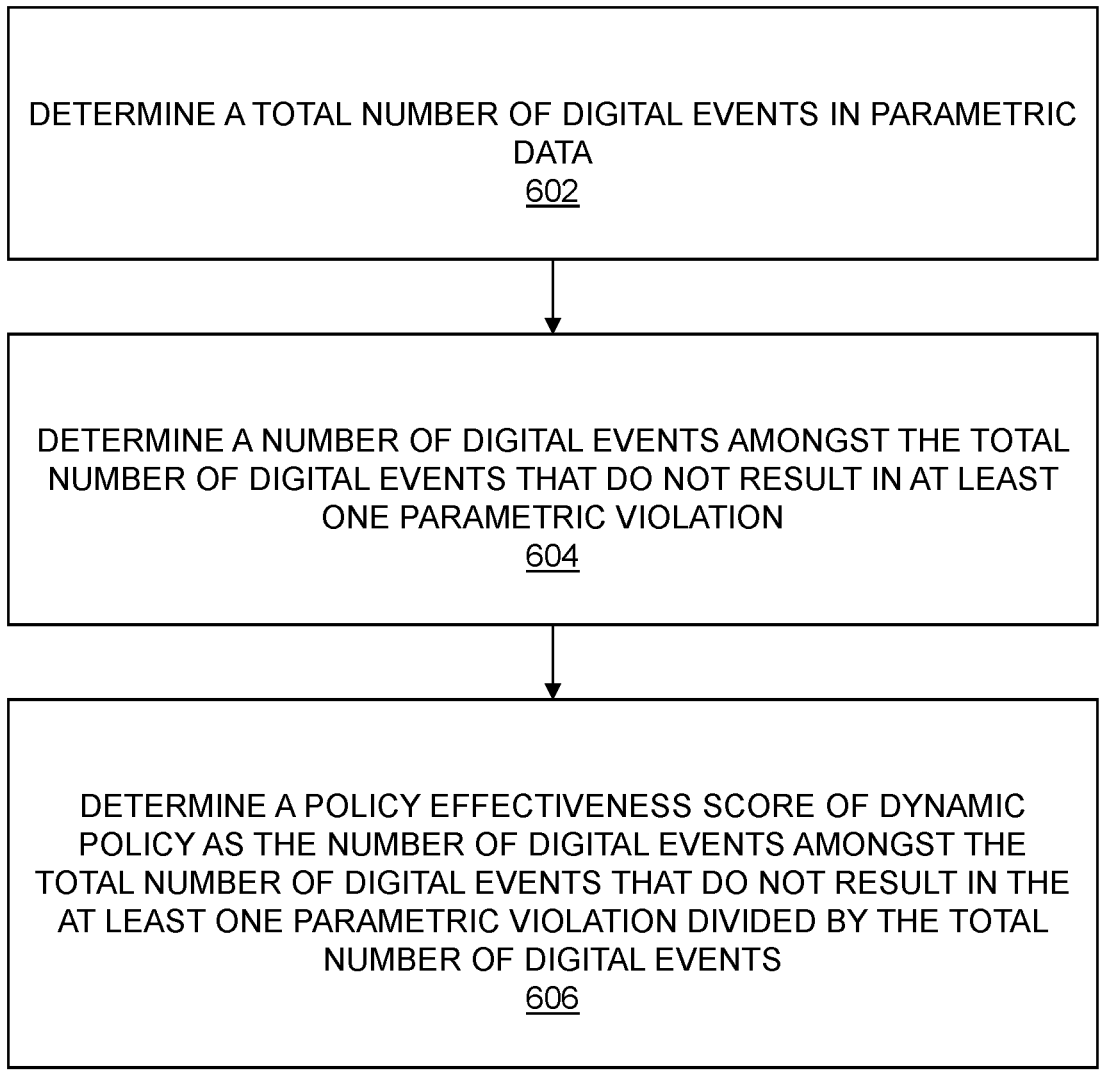
FIG. 6 illustrates a process flow for determining at least one policy effectiveness score for at least one parametric violation, in accordance with an embodiment of the present invention.

Referring to FIG. 6, illustrated is a process flow for determining the at least one policy effectiveness score for the at least one parametric violation, in accordance with an embodiment of the present invention. In an embodiment, the at least one violation in the violation summary is at least one parametric violation of a dynamic policy, and wherein when determining the at least one policy effectiveness score, the at least one processor 122 is configured to: determine (at 602) a total number of digital events in the parametric data; determine (at 604) a number of digital events amongst the total number of digital events that do not result in the at least one parametric violation; and determine (at 606) a policy effectiveness score of the dynamic policy as the number of digital events amongst the total number of digital events that do not result in the at least one parametric violation divided by the total number of digital events.

In this regard, the policy effectiveness score of the dynamic policy is determined in terms of a fraction of digital events that are compliant with the dynamic policy and the total number of digital events. Only digital events that are fully compliant with the dynamic policy do not result in the at least one parametric violation. A digital event is fully compliant with the dynamic policy (i.e., it does not result in the at least one parametric violation) when parametric data of said digital event fully matches with reference parametric values and/or when parametric data of said digital event lies within reference parametric ranges specified according to the dynamic policy. It will be appreciated that a number of parameters need not necessarily be equal to a number of digital events, as a given digital event may involve multiple parameters. The aforesaid manner of analysis of the parametric data enables the system 100 (and in particular, the at least one processor 122, and more particularly, the processing model of the multi-model network executed by the at least one processor 122) to measure variations and understand relational data between the behavior of the digital participants and the dynamic policies that are designed to direct and control intended or pre-approved behavior within certain parameters.

Let us consider, for example, that a given dynamic policy is associated with 15 parameters, and the total number of digital events in the parametric data is equal to 20. Out of these 20 digital events, 14 events do not result in the at least one parametric violation. Then, a policy effectiveness score of the given dynamic policy is equal to 0.7 (i.e., 14 divided by 20).

Optionally, a policy effectiveness score of a dynamic policy is scaled according to a policy effectiveness score of a fixed policy. In this regard, the suitable scale of measurement used for measuring the policy effectiveness of the fixed policy is used as a common scale for measuring policy effectiveness in the system 100. This would enable the at least one processor 122 to accurately determine aggregate policy effectiveness scores and/or average policy effectiveness scores for different types of policies and/or the enterprise 104, as required. In this regard, the at least one processor 122 performs said determining by executing the processing model that employs mathematical formula(s) and/or computing algorithm(s).

Let us consider another example wherein the enterprise 104 has 5 fixed policies and 2 dynamic policies. In such a case, policy effectiveness scores of the 5 fixed policies may be 80, 88, 70, 65 and 90. Furthermore, policy effectiveness scores of the 2 dynamic policies may be 0.82 and 0.7. In this regard, the policy effectiveness scores of the 2 dynamic policies may be scaled to be 82 and 70, respectively, according to the scale of measurement used for measuring the policy effectiveness of the 5 fixed policies. The at least one processor 122 (and in particular, the processing model that employs mathematical formula(s) and/or computing algorithm(s)) may measure aggregate policy effectiveness scores for the 5 fixed policies and the 2 dynamic policies as 393 and 152, respectively. The at least one processor 122 may also measure average policy effectiveness scores for the 5 fixed policies and the 2 dynamic policies as 78.6 and 76, respectively. The at least one processor 122 may also measure aggregate policy effectiveness score and average policy effectiveness score for the enterprise 104 as 545 and 77.857, respectively.

The at least one processor 122 (and in particular, the processing model that employs mathematical formula(s) and/or computing algorithm(s)) determines the at least one compliance score of the digital ecosystem, based on the at least one policy effectiveness score. It will be appreciated that the enterprise 104 may have one or more domains associated therewith. In this regard, the at least one compliance score is determined on a per-domain basis, meaning that a compliance score is determined for each domain, based on policy effectiveness score(s) of policy(-ies) pertaining to said domain. Domains are business lines or also known as departments, or also can be grouped by regulation. The categorization of policies into domains is less about the type of policy and more about the domain. Examples of the domains include, but are not limited to, finance, human resources, sales, and the like. Optionally, the compliance score for a given domain is an aggregate of policy effectiveness score(s) of policy(-ies) pertaining to the given domain. Alternatively, optionally, the compliance score for a given domain is an average of policy effectiveness score(s) of policy(-ies) pertaining to the given domain. Yet alternatively, optionally, the compliance score for a given domain is a weighted average of policy effectiveness score(s) of policy(-ies) pertaining to the given domain. It will be appreciated that when the enterprise 104 has only one domain associated therewith, a single compliance score is generated as an aggregate/average/weighted average of policy effectiveness score(s) of policy(-ies) pertaining to the one domain. The at least one compliance score is a measure of per-domain aggregate policy effectiveness, which is indicative of compliance of the behavior of the digital participants with the at least one policy. For example, the enterprise 104 may have 2 domains D1 and D2 associated therewith, and may have 6 policies P1, P2, P3, P4, P5, and P6 such that the policies P1 and P2 relate to the domain D1 and the policies P3, P4, P5, and P6 relate to the domain D2. Policy effectiveness scores of the policies P1 and P2 would be used to determine a compliance score C1, and policy effectiveness scores of the policies P3, P4, P5, and P6 would be used to determine a compliance score C2. The compliance score C1 pertains to the domain D1 whereas the compliance score C2 pertains to the domain D2.

Optionally, the at least one processor 122 is further configured to: assign a weight to each policy in the at least one policy document, wherein the weight is assigned based on an importance of said policy; and determine at least one weighted policy effectiveness score of each policy in the at least one policy document, wherein a given weighted policy effectiveness score is a product of the weight assigned to said policy and a policy effectiveness score of said policy, and wherein the at least one compliance score of the digital ecosystem is determined based on the at least one weighted policy effectiveness score. It will be appreciated that not every policy in the at least one policy document may be equally important. Some policies may be critical to the working of the digital ecosystem and this may be more important than other policies. The weight may lie in any suitable range that is employed, the range being, for example, one of: −1 to 1, 0 to 1, 0 to 10, 0 to 100, and the like. As an example, the digital ecosystem may have 4 policies P1, P2, P3, and P4 with policy effectiveness scores of 75, 80, 65, and 90. The weights of these 4 policies P1, P2, P3, and P4 may be 0.8, 0.6, 0.8, and 1, respectively. The weighted policy effectiveness scores of the 4 policies P1, P2, P3, and P4 are 60, 48, 52, and 90.

The at least one processor 122 (and in particular, the processing model that employs mathematical formula(s) and/or computing algorithm(s)) determines the governance score of the digital ecosystem, based on the at least one compliance score. The term "governance score" is a measurable quantity that is indicative of a level of effectiveness of governance (i.e., the digital governance) of an enterprise. The enterprise 104 to which the digital ecosystem belongs employs the at least one policy to implement the digital governance, but in reality, as the digital ecosystem is used, effectiveness of the digital governance could be compromised. The at least one policy effectiveness score and the at least one compliance score are building blocks for understanding the enterprise's 104 governance effectiveness. The accurate automated determination of the governance score by the at least one processor 122 (and in particular, by the processing model that employs mathematical formula(s) and/or computing algorithm(s)) means that the enterprise 104 need no longer be reliant upon traditional audit schedules to understand risk, fix time, training opportunities, and policy gaps. Further, governance scores render both individual enterprise governance health and industry governance health. When such governance scores of multiple enterprises are aggregated and anonymized, they render governance health for an industry to which the multiple enterprises belong, in a period of time and historically. This is useful to the enterprise 104, to end clients (i.e., consumers), to regulators, and can ultimately help society progress forward through predictive and dynamically controlled digital governance, collectively known as proof of governance. The governance score can be understood to constitute a proof of governance as it is indicative of the fact that digital governance is implemented for the digital ecosystem and is also indicative of how effective such digital governance actually is.

Optionally, the governance score of the digital ecosystem is an aggregate of the at least one compliance score. Alternatively, optionally, the governance score of the digital ecosystem is an average of the at least one compliance score. Yet alternatively, optionally, the governance score of the digital ecosystem is a function of the at least one compliance score. This function could be a weighted function, a linear function, a non-linear function, or similar.

The at least one processor 122 (and in particular, the communication device 124 coupled to the at least one processor) communicates the governance score to the target server 126, for enabling the enterprise 104 in implementing the at least one action for maintaining or improving governance in the digital ecosystem. Such communication may be sent by the at least one processor 122 to the target server 126 via the communication device 124. The governance score may be communicated in real time or near-real time. Upon receiving the governance score, the enterprise 104 (and specifically, people associated with the enterprise 104) may determine the at least one action that is to be implemented either manually, or with the help of the system 100.

Optionally, the at least one action is at least one of: a policy recommendation, a training recommendation. The purpose of the at least one action is to enhance, recommend, and/or dynamically control the digital governance in the digital ecosystem through policy. The term "policy recommendation" encompasses any recommendation that is made in respect of the at least one policy used by the enterprise 104. This means that the policy recommendation could be one or more of a recommendation for removing a policy, a recommendation for amending a policy, a recommendation for how to amend a policy, a recommendation for adding a new policy, and similar. The policy recommendation may be made also based on policies of another enterprise with a similar digital ecosystem as the digital ecosystem of the enterprise 104 and a better governance score than the governance score of the digital ecosystem. Another enterprise may be in the same domain or a different domain than the enterprise 104. The term "training recommendation" encompasses any recommendation that is made in respect of training the digital participants so that their behavior within the digital ecosystem is compliant with the at least one policy of the enterprise 104 to which the digital ecosystem belongs. This means that the training recommendation could be one or more of a recommendation for informing the digital participants about a policy, a recommendation for providing the digital participants training support when they are executing a procedure in a policy, a recommendation for prompting the digital participants when they deviate from a procedure in a policy, a recommendation for prompting the digital participants when they enter incorrect parametric values, a recommendation for prompting the digital participants when parametric values entered by them lie outside of the reference parametric ranges, and similar.

As an example, the policy recommendation may be a recommendation for amending a dynamic policy by triggering parameters. The parameter triggering may be automated and may programmatically change threshold parameters. This creates dynamic policy control initiated by predefined and approved governance controls without human intervention and manual analysis. Instead, program language understands both the parameter within the policy and/or procedures, and a result of a digital event. The result of the digital event is analyzed for its proximity to the parameter and threshold instruction, including but not limited to frequency and rate. Program language automates the changes based on the analyses.

Figure 7:
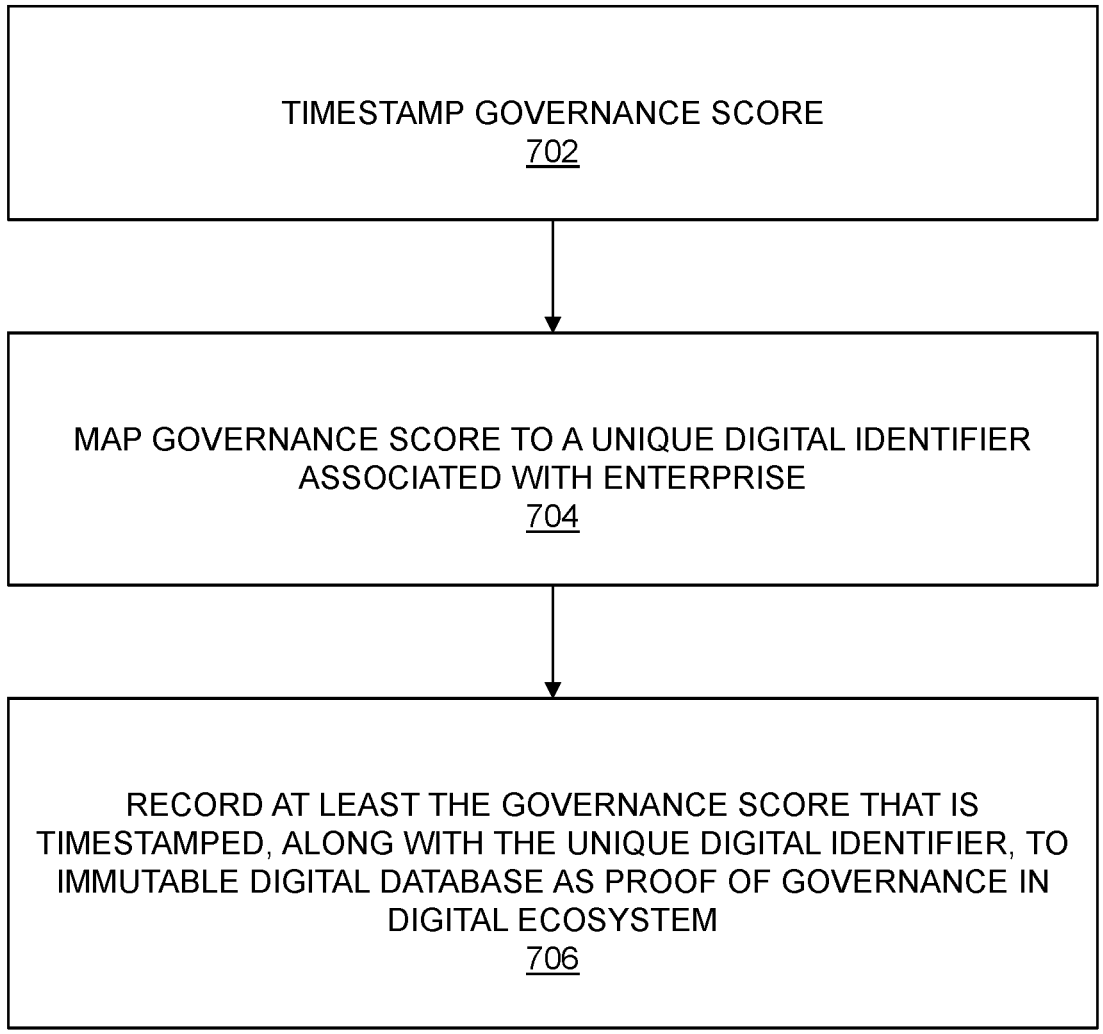
FIG. 7 illustrates a process flow for recording proof of governance, in accordance with an embodiment of the present invention.

Referring to FIG. 7, illustrated is a process flow for recording the proof of governance, in accordance with an embodiment of the present invention. In an embodiment, the at least one processor 122 is further configured to: timestamp (at 702) the governance score; map (at 704) the governance score to a unique digital identifier associated with the enterprise 104; and record (at 706) at least the governance score that is timestamped, along with the unique digital identifier, to an immutable digital database as a proof of governance in the digital ecosystem. Such processing steps may be performed by the processing model of the at least one processor 122. By timestamping the governance score, the at least one processor 122 tags the governance score with a time and date at which the governance score was computed. Timestamping is very useful in analyzing trends of governance scores over a period of time. The unique digital identifier may be expressed as one or more of: an alphabetic identifier, a numeric identifier, an alphanumeric identifier, a quick response code, a symbol, a bar code, and the like. The mapping of the governance score to the unique digital identifier associated with the enterprise 104 may be implemented by an ID mapping module of the at least one processor 122. The ID mapping module is configured to anonymize the digital participants to ensure that the proof of governance is established without the need of Personal identifying information (PII). Optionally, the at least one processor 122 is configured to: generate the unique digital identifier to be associated with the enterprise 104 at a time of onboarding the target server 126 of the enterprise 104 with the system 100, and associate the unique digital identifier with the enterprise 104. In such onboarding, the system 100 (and specifically, the ID mapping module of the at least one processor 122) may firstly generate the unique digital identifier that is to be associated with the enterprise 104 and then map existing metadata of the target server 126 to the unique digital identifier for associating the unique digital identifier to the enterprise 104. Optionally, the at least one processor 122 (and in particular, the ID mapping module) is configured to store the mapping of unique digital identifiers of enterprises at the data repository 120. Furthermore, optionally, the at least one processor 122 is configured to store the mapping of unique digital identifiers of enterprises as an immutable record at the immutable digital database. Beneficially, the unique digital identifier is employed when recording at least the governance score to the immutable digital database, so as to avoid using Personal Identifying Information (PII) of the enterprise 104. In other words, the recording to the immutable digital database is performed without requiring PII. This protects the privacy of the enterprise 104. The proof of governance in the digital ecosystem of the enterprise 104 is established as at least the recorded governance score that is timestamped and associated with the unique digital identifier. The proof of governance serves as an immutable proof that governance exists in the digital ecosystem and is acted upon to protect the digital participants and users of the digital ecosystem. The proof of governance is accessible and/or retrievable from the immutable digital database for viewing, auditing, and the like. The recordal of the proof of governance on the immutable digital database establishes a Govbit(z), which is a governance decision on the immutable digital database. The Govbit(z) is an immutable record of data/information stored on the immutable digital database. The Govbit(z) can be retrieved from the immutable digital database for auditing and proof of governance. The Govbit(z) may be an authorization of an immutable digital governance for the digital participants, and the at least one processor 122 may be configured for storing the Govbit(z) on the immutable digital database. Further, the Govbit(z) may be securely accessed and validated by digital participants, authorities (such as regulatory authorities), enterprises, etc. from the immutable digital database. It is important to ensure that governance decisions are based on unbiased independent measurement and analysis. For this reason, the proof of governance can only be established when facilitated, supported, and effectuated by an external entity, such as the system 100. Once the proof of governance is established, the enterprise 104 can leverage their proof of governance performance to build more trust in commerce with their consumers (i.e., end-users) and their regulatory authorities.

Optionally, the at least one processor 122 is further configured to timestamp, map to the unique digital identifier associated with the enterprise 104, and record at least one of: the at least one policy effectiveness score, the at least one compliance score, the violation summary, the event data, the at least one policy document, to the immutable digital database. In this regard, the at least one of: the at least one policy effectiveness score, the at least one compliance score, the violation summary, the event data, the at least one policy document, also constitute the proof of governance in addition to the governance scores. At least one of the aforesaid scores/data are indicative of governance health of the digital ecosystem and provide insight as they constitute measured evidence for the value of the governance score. Such processing steps may be performed by the processing model of the at least one processor 122.

Optionally, the immutable digital database is an immutable distributed ledger or a blockchain. The immutable digital database can be implemented as any immutable digital capture technology. The immutable digital database is employed since anything recorded to the immutable digital database is unchangeable. This means that the proof of governance established on the immutable digital database is unchangeably recorded for present and future reference. The immutable distributed ledger may be hosted by a private centralized server, wherein the at least one processor 122 is communicably coupled to the private centralized server. The blockchain may be a private blockchain.

Optionally, the at least one processor 122 is further configured to: receive, from the data repository 120, at least one new policy document indicative of at least one new policy implemented by the enterprise 104; generate a smart contract to enforce an action of implementing the at least one new policy, wherein the smart contract is linked with the unique digital identifier associated with the enterprise 104, and wherein the smart contract comprises a version of the at least one new policy along with a unique policy identifier associated with the at least one new policy, a governance decision of implementing the action, and a timestamp of generating the smart contract; and record the smart contract to the immutable digital database. In this way, the immutable digital database recordal of action(s) and enables enforcement of the at least one new policy. A given new policy may be a completely new policy, an amended version of an existing policy, or similar. The unique policy identifier (ID) may be expressed as one or more of: an alphabetic identifier, a numeric identifier, an alphanumeric identifier, a quick response code, a symbol, a bar code, and the like. In this regard, a Govbit(z) is created on the immutable digital database. The action of implementing the at least one new policy may optionally be recommended by the at least one processor 122. Optionally, the at least one new policy document indicative of at least one new policy implemented by the enterprise 104 is communicated by the target server 126 of the enterprise 104 to the data repository 120. The smart contract is a self-executing secure digital contract that is enforceable on parties to the smart contract. The smart contract described hereinabove is applicable to the enterprise 104 and to the digital participants in the digital ecosystem. The smart contract reduced paperwork, is generated quickly, and are non-tamperable since it is recorded to the immutable digital database.

Optionally, the data repository 120 is communicably coupled to a server 132 of at least one regulatory authority, and wherein the data repository 120 is configured to obtain regulations and/or statutes set by industries for the enterprises from the server of at least one regulatory authority and store the regulations and/or statutes in the form of a regulatory library, wherein the regulatory library comprises at least one regulatory document, the at least one regulatory document being used by the enterprises to develop their policies and procedures.

It will be appreciated that the at least one regulatory authority may regularly or intermittently amend its existing regulations and/or statutes, add new regulations and/or statutes, remove one or more of its existing regulations and/or statutes, or similar. The data repository 120 is automatically sent information of such regulation and/or statute changes by the server 132 of the at least one regulatory authority or the data repository 120 prompts the server 132 of the at least one regulatory authority periodically or intermittently to update itself of such regulation and/or statute changes.

Optionally, the regulatory library comprises one or more regulatory documents generated by the at least one regulatory authority. Optionally, in this regard, the regulatory library comprises at least all regulatory document(s) that are applicable to the enterprise 104 to which the digital ecosystem belongs. The regulatory library is a digital database maintained by the data repository 120 for storing the one or more regulatory documents. Any enterprise needs to abide by (i.e., conform to) one or more regulations and/or statutes to guide its compliance. A regulatory document may be understood to be a single-page or multi-page document that sets regulations and/or statutes for behavior in the digital ecosystem. Optionally, the at least one regulation and/or at least one statute set by industries for the enterprises serves as a reference from which the at least one policy used by the enterprise 104 is derived. Therefore, the at least one regulatory document is related to the at least one policy document, the at least one policy document being generated based on the at least one regulatory document. The at least one regulatory document may optionally be used as a reference for generating the policy recommendation and/or a recommendation of a regulation and/or statute (described later). The at least one regulatory authority could be an independent regulatory authority, an industry-specific regulatory authority, a government regulatory authority, or similar.

Optionally, the at least one processor 122 receives the at least one regulatory document from the regulatory library in real time or in near-real time. This ensures that the at least one processor 122 is always up-to-date with latest regulations and/or statutes applicable to the enterprise 104 (and specifically, to the digital ecosystem). Optionally, the at least one regulatory document is in form of at least one of: a text document, a spreadsheet. The at least one regulatory document could be in any form that is capable of being processed by the at least one processor 122.

Figure 8:
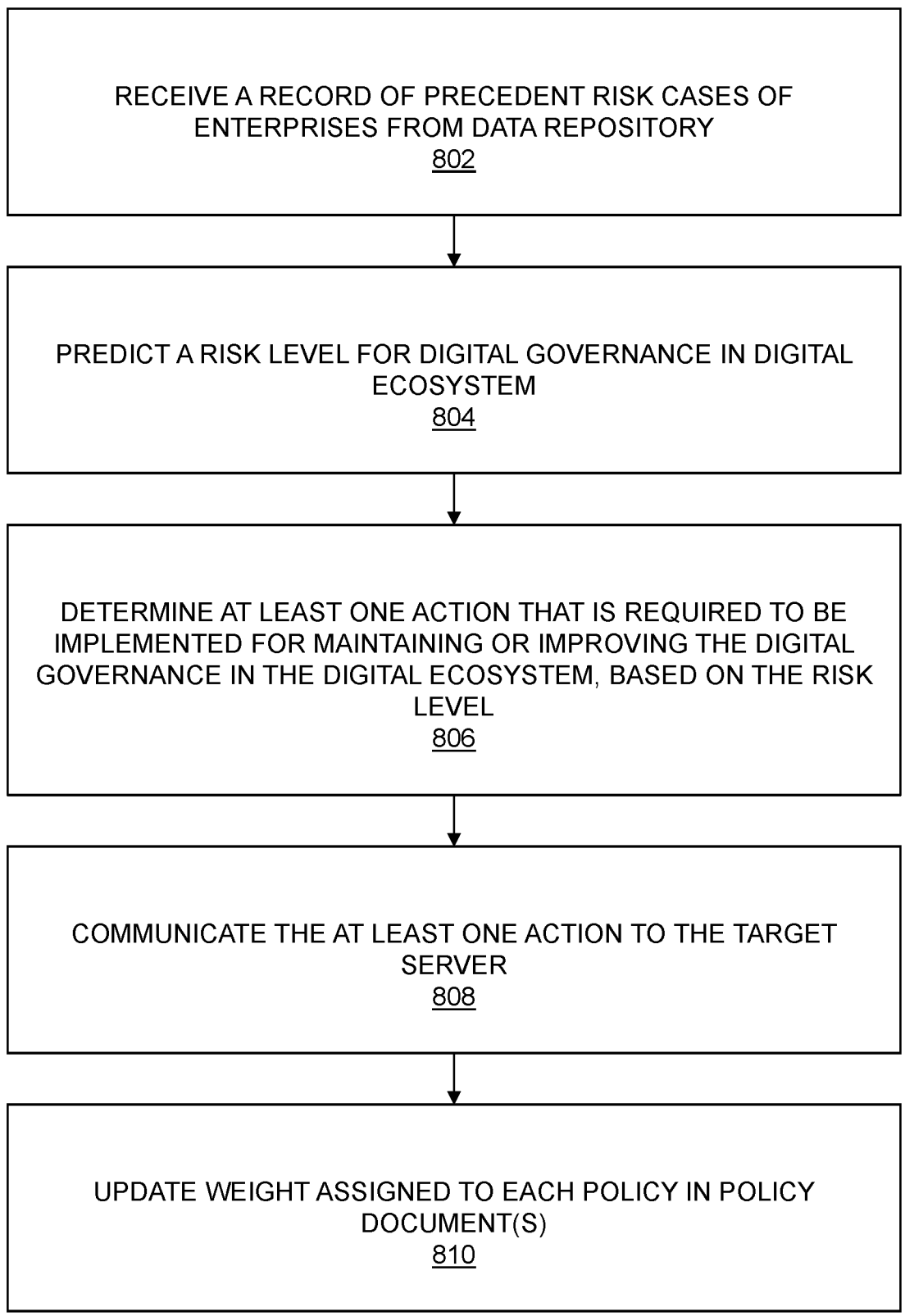
FIG. 8 illustrates a process flow for determining at least one action that is required to be implemented for maintaining or improving the digital governance in the digital ecosystem, in accordance with an embodiment of the present invention.

Referring to FIG. 8, illustrated is a process flow for determining the at least one action that is required to be implemented for maintaining or improving the digital governance in the digital ecosystem, in accordance with an embodiment of the present invention. In an embodiment, the data repository 120 is further configured to maintain thereat a record of precedent risk cases of enterprises, and wherein the at least one processor 122 is further configured to: receive (at 802) the record of precedent risk cases of the enterprises from the data repository; predict (at 804) a risk level for the digital governance in the digital ecosystem, based at least upon the violation summary, and the at least one policy effectiveness score; determine (at 806) the at least one action that is required to be implemented for maintaining or improving the digital governance in the digital ecosystem, based on the risk level; and communicate (at 808) the at least one action to the target server 126. Optionally, the at least one processor 122 is configured to update (at 810) the weight assigned to each policy in the at least one policy document.

Optionally, in this regard, the at least one processor 122 (and in particular, the AI model executed by the at least one processor 122) recommends the at least one action to the enterprise 104. This reduces an effort on part of the enterprise 104 in terms of analyzing indicators of the digital governance in the digital ecosystem and deducing actions that may maintain or improve the digital governance. Moreover, since the at least one processor 122 accurately analyses the digital event data, the policies used by the enterprise 104, the precedent risk cases of enterprises, the violation summary, the at least one policy effectiveness score, in detail, the at least one action recommended by the at least one processor 122 is very useful for managing, controlling, or enhancing governance in the digital ecosystem.

Optionally, the at least one processor 122 executes a predictive model for predicting the risk level for the digital governance in the digital ecosystem. At least the record of precedent risk cases of enterprises, the violation summary, and the at least one policy effectiveness score serve as inputs to the predictive model. The predictive model serves as a tool to forecast the digital ecosystem/the enterprise 104's fine risk according to aggregated series of scores (indicative of performance) generated over time by the at least one processor 122. Such scores include at least the at least one policy effectiveness score, and may also include governance scores, the at least one compliance score, and the like. The predictive model is the AI model executed by the at least one processor 122. The violation summary is analyzed with respect to those precedent risk cases which relate to similar violations as in the digital ecosystem, and then performance data relating to said precedent risk cases is compared with performance data (such as the at least one policy effectiveness score) of the digital enterprise, to accurately determine the risk level. Optionally, the predictive model is a machine learning-based model. In this regard, the predictive model may be trained using at least one machine learning algorithm until a required accuracy of the predictive model is achieved. Such machine learning algorithms are well-known in the art. The predictive model forecasts the risk level of the digital ecosystem's digital governance not meeting regulations and/or statutes in the at least one regulatory document, given the precedent risk cases of enterprises, and the digital ecosystem's violation summary and policy effectiveness score(s). Optionally, the at least one processor 122 is configured to predict the risk level for the digital governance in the digital ecosystem, based also on the at least one compliance score. Optionally, the risk level is a fine risk level (i.e., a risk level that attracts fines or penalties). Alternatively, optionally, the risk level is a warning risk level (i.e., a risk level that attracts warnings). Yet alternatively, optionally, the risk level is a general risk level (i.e., a risk level that indicates unreliability of the digital events in the digital ecosystem).

Optionally, the data repository 120 is further configured to store historical and current performance data of the enterprise 104, the historical and current performance data comprising at least one of: historical and current violation summaries, historical and current policy effectiveness scores, historical and current compliance scores, historical and current governance scores, of the enterprise 104, and wherein when predicting the risk level for the digital governance in the digital ecosystem, the at least one processor 122 is configured to process the historical and current performance data of the enterprise 104 using at least one predictive modeling technique. Herein the performance data can be understood to be outputs generated by the at least one processor 122 (and in particular, by the processing model of the at least one processor 122) that are related to the digital governance in the digital ecosystem. The historical and current performance data of the enterprise 104 represents both historical and in real-time assessment of the digital governance in the digital ecosystem, and is thus used to perform the predictive analysis. Historical data may be collected internal historical data, which is collected during a historical time duration that the target server 126 has been onboarded with the system 100 and/or external historical data that is collected from an external source at a time of onboarding the target server 126. The at least one processor 122 compares the current performance data with the historical performance data (which is an evidentiary precedent of historical risky/penalty-worthy/warning-worthy events/cases) to determine a similarity therebetween. Greater the similar of current performance data with historical performance data leading to historical risky/penalty-worthy events/cases, higher is the risk level for the digital governance in the digital ecosystem. The at least one processor 122 drives corrective action(s) based on the predicted risk level so that the governance score of the digital ecosystem does not drop to a point wherein it is too risky or attracts penalties. The at least one action is determined to be such that when implemented, it would enable the enterprise 104 to maintain the digital governance in the digital ecosystem if the governance score is suitably high and the risk level is low, or to improve the digital governance in the digital ecosystem is the governance score is unsuitably low and the risk level is high.

Further, the present disclosure describes pre-processing and post-processing of a digital event. The enterprise 104 may remain as the executer of any governance policy. The system 100 may begin the life-cycle of the proof of governance in two ways. The first way may be the Transaction Receiver receives meta data from the customer prior to settling a participant's digital transaction event and the Transaction Receiver would enforce a static policy and then establish the proof of governance as described above. The second way may be the Transaction Receiver would receive the meta data from the customer after the digital transaction event is settled and then establish the proof of governance as described above.

Further, the present disclosure employs Transaction Receiver. Further, the system 100 may leverage the Transaction Receiver so that the system 100 operates behind the Enterprise 104's applications without disrupting their digital participant's experience. The Transaction Receiver may be fed with the Enterprise 104's transaction meta data (i.e., the digital event data) which is established during onboarding via an API. The Transaction Receiver may be software and/or firmware. The system 100 may leverage APIs to deploy itself as a governance agent within the enterprise 104's network. The system 100 may also use API to receive meta data to conduct and establish proof of governance on behalf of the enterprise 104. The API interacts with the at least one processor 122.

As an example, the immutable digital database may be the Hyperledger Fabric blockchain. In this example, the GovBit (z) may be committed to the Hyperledger Fabric blockchain in 3 steps. At first, the system 100 may send governance score(s), the unique identifier of the enterprise 104, training recommendations, policy recommendations, the violation summary, or any additional information, collectively known as actions (synonymous with governance decision) to a Smart Contract. Then, the Smart Contract may run on transactions to immutably capture governance decisions, and the resulting Govbit(z) may be sent back to the system 100 for retrieving. Finally, Govbit(z) are packaged into blocks and then distributed to a private channel on the node for commitment to its ledger. The blockchain will be used by the system 100 to record and retrieve in real time, near time, and or scheduled time, and access to the blockchain will be permissioned. in the case where a new policy is added to the repository or a policy is updated to a new version, the system 100 may enforce that action via a smart contract and record the unique policy ID of that new policy to the blockchain immutably.

Optionally, the at least one processor 122 is further configured to: analyze the digital event data to determine the behavior of the digital participants within the digital ecosystem; generate a recommendation of at least one regulation and/or statute, based at least on the behavior of digital participants; and communicate said recommendation to the server 132 of at least one regulatory authority. The aforesaid processing steps are performed by the processing model executed by the at least one processor 122. In this regard, the at least one processor 122 determines and suggests the recommendation to establish proactive regulation. The analysis of the digital event data provides insight into the (real time) behavior of the digital participants within the digital ecosystem, and such insight is used to generate the recommendation. When such analysis reveals undesirable trends or patterns of the behavior of the digital participants that violate policies, the at least one processor 122 generates the recommendation to curb such undesirable trends or patterns. Optionally, the at least one processor 122 generates the recommendation of at least one regulation and/or statute, based also on the at least one regulatory document. In this regard, upon identifying the behavior of the digital participants that violates policies, the at least one processor 122 identifies which behavioral activity violated which policy and in turn violated which regulation. This enables the at least one processor to generate an accurate and useful recommendation of the at least one regulation and/or statute. The at least one processor 122 communicates said recommendation to the server 132 for consideration, as a way of enabling proactive regulation. The at least one regulatory authority is free to implement or reject the recommendation.

It will be appreciated that the system 100 supports aggregation of anonymized behavior of digital participants across an industry, as the system 100 can be deployed for use with various digital ecosystems in the industry. The various digital ecosystems may be associated with various enterprises. The anonymized behavior of digital participants may be aggregated at the data repository 120 using various communication devices. The at least one processor 122 accesses this aggregated anonymized behavior of digital participants and generates the recommendation based thereupon. In this regard, different processors of the system 100 may be employed for implementing processing tasks associated with managing governance in different ecosystems. A person/entity would not have access to the system 100 to make the recommendation. Only the at least one processor 122 would have access to the anonymized behavior of digital participants across the industry for making the recommendation.

Optionally, as mentioned earlier, the at least one processor 122 is configured to update (at 810) the weight assigned to each policy in the at least one policy document. When the target server 126 is onboarded to the system 100, the at least one processor 122 may assign an initial weight to each policy based on an assessment of said policy and the digital ecosystem and/or the enterprise 104. Then, the initial weight may be updated at a later time by the at least one processor 122, based upon at least one of: governance requirements of the digital ecosystem and/or the enterprise 104, performance data of the enterprise 104, fine data, the risk level for the digital governance in the digital ecosystem.

Figure 9:
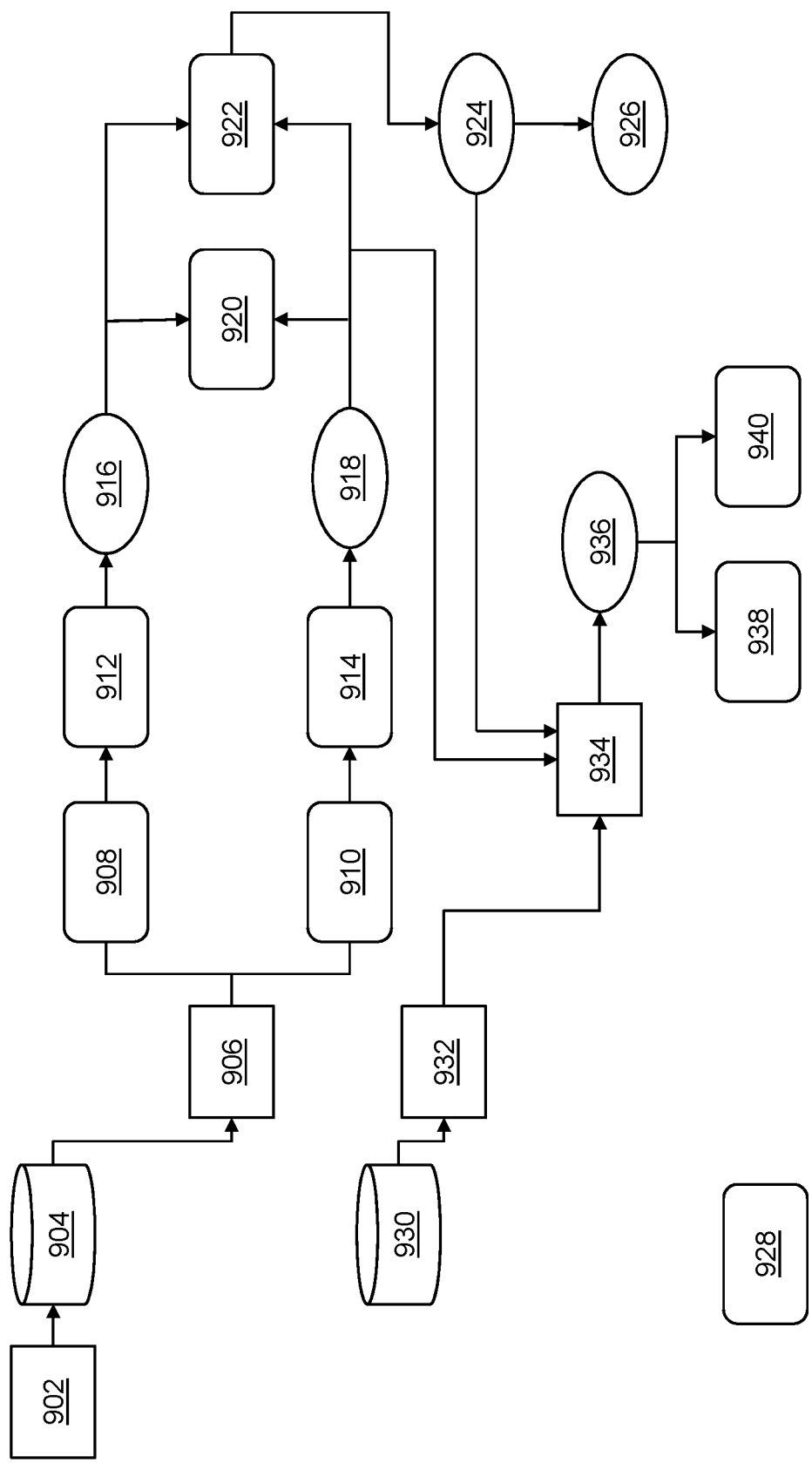
FIG. 9 illustrates a high-level processing flow implemented by the system, in accordance with an embodiment of the present invention.

Referring to FIG. 9, illustrated is a high-level processing flow implemented by the system 100, in accordance with an embodiment of the present invention. An ID mapping module 902 of the at least one processor 122 is coupled to a client database 904. The client database 904 is a database maintained by the target server 126 of the enterprise 104. Using the at least one policy document in the client database 904, there is created a policy library 906 at the data repository 120 of the system 100. The policy library 906 could include at least one fixed policy 908 and/or at least one dynamic policy 910. The at least one fixed policy 908 is associated with one or more procedures 912. The at least one dynamic policy 910 is associated with one or more parameters 914. A procedure assessment 916 is carried out to determine whether any procedural violation occurs. A parametric assessment 918 is carried out to determine whether any parametric violation occurs. The procedure assessment 916 and the parametric assessment 918 result in generation of a violation summary 920. The violation summary 920 is used to determine at least one policy effectiveness score 922. The at least one policy effectiveness score 922 is used to determine at least one compliance score 924 of the digital ecosystem, and the at least one compliance score is used to determine a governance score 926 of the digital ecosystem. The governance score enables the enterprise 104 in implementing at least one action for maintaining or improving the digital governance in the digital ecosystem. Recordal of proof of governance to an immutable digital database occurs at 928. This results in Govbit(z) committed to an immutable ledger then establishes proof-of-governance. A further supporting feature that is designed to further drive good governance behavior by the enterprise 104 by alerting to risk is described as follows. A regulator database 930 may be maintained at the server 132 of the at least one regulatory authority. Using the at least one regulatory document in the regulator database 128, there may be created a regulatory library 932 at the data repository 120 of the system 100. The regulatory library comprises at least one regulatory document being used by the enterprises to develop their policies and procedures A risk level prediction 934 may be carried out (using an AI model) to predict a risk level for the digital governance in the digital ecosystem, and based on the risk level 936, the at least one action that is required to be implemented for maintaining or improving the digital governance in the digital ecosystem, may be recommended. The at least one action is at least one of: a policy recommendation 938, a training recommendation 940. The at least one regulatory document may be used for generating the policy recommendation 938.

Figure 10:
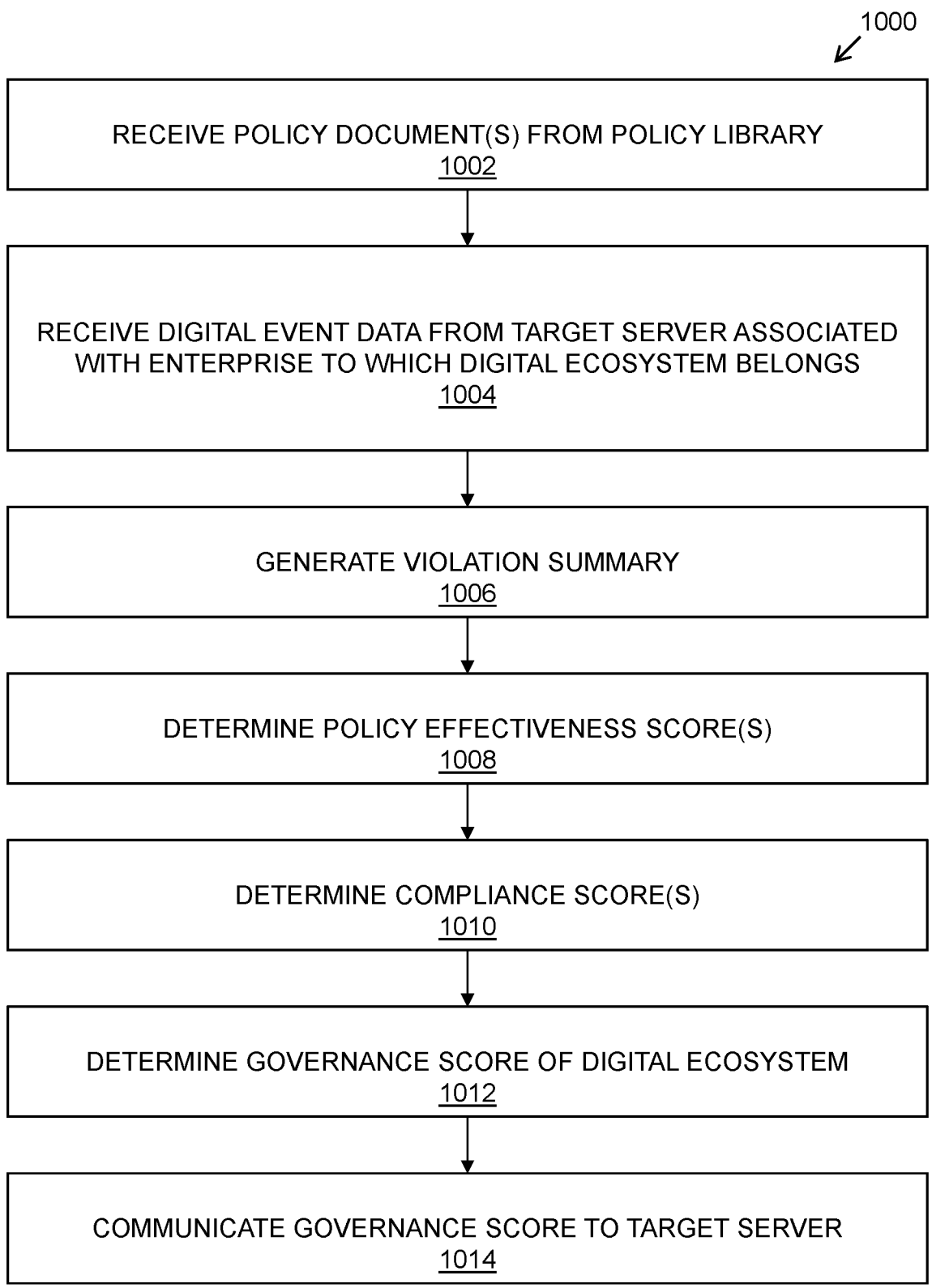
FIG. 10 illustrates a flowchart depicting steps of a method for managing digital governance in a digital ecosystem, in accordance with an embodiment of the present invention.

Referring to FIG. 10, illustrated is a flowchart depicting steps of a method 1000 for managing digital governance in a digital ecosystem, in accordance with an embodiment of the present invention. At step 1002, the at least one policy document is received from the policy library that is maintained at the data repository 120, wherein the policy library includes policies and procedures used by enterprises, and wherein the at least one policy document is used by the enterprise 104 to which the digital ecosystem belongs. At step 1004, the digital event data is received from the target server 126, wherein the digital event data is indicative of behavior of digital participants within the digital ecosystem, and wherein the target server 126 is associated with the enterprise 104 to which the digital ecosystem belongs. At step 1006, the violation summary is generated, based on the at least one policy document and the digital event data, wherein at least one violation is recorded in the violation summary when the digital event data is non-compliant with the at least one policy document. At step 1008, the at least one policy effectiveness score is determined, based on the violation summary. At step 1010, the at least one compliance score is determined, based on the at least one policy effectiveness score. At step 1012, the governance score of the digital ecosystem is determined, based on the at least one compliance score. At step 1014, the governance score is communicated to the target server 126, for enabling the enterprise 104 in implementing at least one action for maintaining or improving the digital governance in the digital ecosystem. The method 1000 enables efficient and accurate management of the digital governance in the digital ecosystem. The method 1000 is simple, fast, and reliable.

Optionally, the method 1000 further comprises: timestamping the governance score; mapping the governance score to a unique digital identifier associated with the enterprise 104; and recording at least the governance score that is timestamped, along with the unique digital identifier, to an immutable digital database as a proof of governance in the digital ecosystem. The process flow for these steps is described above in conjunction with FIG. 7.

Optionally, the method 1000 further comprises: receiving, from the data repository 120, at least one new policy document indicative of at least one new policy implemented by the enterprise 104; generating a smart contract for enforcing an action of implementing the at least one new policy, wherein the smart contract is linked with the unique digital identifier associated with the enterprise 104, and wherein the smart contract comprises a version of the at least one new policy along with a unique policy identifier associated with the at least one new policy, a governance decision of implementing the action, and a timestamp of generating the smart contract; and recording the smart contract to the immutable digital database. These steps are described above.

Optionally, the method 1000 further comprises: receiving a record of precedent risk cases of the enterprises; predicting a risk level for the digital governance in the digital ecosystem, based at least upon the violation summary and the at least one policy effectiveness score; determining the at least one action that is required to be implemented for maintaining or improving governance in the digital ecosystem, based on the risk level; and communicating the at least one action to the target server 126. The process flow for these steps is described above in conjunction with FIG. 8.

Optionally, in the method 1000, the at least one violation in the violation summary is at least one procedural violation of a fixed policy, and wherein the step of determining the at least one policy effectiveness score comprises: initializing a policy effectiveness score of the fixed policy to a first value, wherein the first value is a maximum score representing a whole; reducing the first value to a second value by deducting points corresponding to the at least one procedural violation from the maximum score; and determining the policy effectiveness score of the fixed policy as the second value. The process flow for these steps is described above in conjunction with FIG. 5.

Optionally, in the method 1000, the at least one violation in the violation summary is at least one parametric violation of a dynamic policy, and wherein the step of determining the at least one policy effectiveness score comprises: determining a total number of digital events in the parametric data; determining a number of digital events amongst the total number of digital events that do not result in the at least one parametric violation; and determining a policy effectiveness score of the dynamic policy as the number of digital events amongst the total number of digital events that do not result in the at least one parametric violation divided by the total number of digital events. The process flow for these steps is described above in conjunction with FIG. 6.

The present disclosure also provides the computer program product as described above. Various embodiments and variants disclosed above, with respect to the aforementioned system 100 and method 1000, apply mutatis mutandis to the computer program product. In the computer program product, examples of the non-transitory machine-readable storage medium include, but are not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, or any suitable combination thereof.

The system 100, the method 1000, and the computer program product disclosed above, provide an innovative and an efficient solution for managing digital governance in digital ecosystems. The system 100, the method 1000, and the computer program product provide an efficient and effective solution for the purposes of enhancing, recommending, and dynamically controlling governance through policy. Such enhancing, recommending, and dynamically controlling governance is performed without the need for PII. The system 100, the method 1000, and the computer program product leverage ethical AI to compute behavior anomalies amongst digital participants within digital ecosystems for the aforementioned purposes. Further, the system 100 may detect digital participants who leverage the rapid growth of digital transformations to carry out malicious events in the digital ecosystem. The system 100, the method 1000, and the computer program product enable establishment of proof of governance on immutable digital databases, for example, for auditing purposes, to establish trust between the digital ecosystems and their end-users, and the like. In doing so, the system 100 serves as an unbiased third party with respect to the digital ecosystems and their end-users. As more users integrate with digital ecosystems acting as digital participants, more is the necessity of digital governance and proof of its effectiveness to protect the users. The system 100, the method 1000, and the computer program product enable recordal of governance decisions on the immutable digital databases, and also enable in establishing proactive regulation with insight of digital participant behavior in real-time. Further, the system 100 may enhance, discover, and recommend policies dynamically to safeguard the digital participants. Many industries are encouraged to look at their policies annually and as a best practice every 6 months. From drafting, to approval, to implementation, and then evaluation, the policies may lose effectiveness and its ability to prevent the desired intent because the ecosystem it governs is dynamic in nature. The method 1000 described herein sits on top of existing governance and within digital ecosystems to effectively manage governance in real time, so that the desired intent of the policies is achieved.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

What is claimed is:

1. A system for managing digital governance in a digital ecosystem,
   the system comprising:
   a data repository configured to maintain thereat at least a policy library including policies and procedures used by enterprises; and
   at least one processor communicably coupled to the data repository, wherein the at least one processor is configured to:
   receive at least one policy document from the policy library, wherein the at least one policy document is used by an enterprise to which the digital ecosystem belongs;
   receive digital event data from a target server, wherein the digital event data is indicative of behavior of digital participants within the digital ecosystem, and wherein the target server is associated with the enterprise to which the digital ecosystem belongs;
   generate a violation summary, based on the at least one policy document and the digital event data, wherein at least one violation is recorded in the violation summary when the digital event data is non-compliant with the at least one policy document;
   determine at least one policy effectiveness score, based on the violation summary, wherein the at least one violation in the violation summary is at least one procedural violation of a fixed policy, and wherein when determining the at least one policy effectiveness score, the at least one processor is configured to:
   initialize a policy effectiveness score of the fixed policy to a first value, wherein the first value is a maximum score representing a whole;
   reduce the first value to a second value by deducting points corresponding to the at least one procedural violation from the maximum score; and
   determine the policy effectiveness score of the fixed policy as the second value;
   determine at least one compliance score, based on the at least one policy effectiveness score;
   determine a governance score of the digital ecosystem, based on the at least one compliance score;
   timestamp the governance score;
   map the governance score to a unique digital identifier associated with the enterprise;
   record at least the governance score that is timestamped, along with the unique digital identifier, to an immutable digital database as a proof of governance in the digital ecosystem; and
   communicate the governance score to the target server, for enabling the enterprise in implementing at least one action for maintaining or improving the digital governance in the digital ecosystem.

2. The system according to claim 1, wherein the immutable digital database is an immutable distributed ledger or a blockchain.

3. The system according to claim 1, wherein the at least one processor is further configured to:

receive, from the data repository, at least one new policy document indicative of at least one new policy implemented by the enterprise;

generate a smart contract to enforce an action of implementing the at least one new policy, wherein the smart contract is linked with the unique digital identifier associated with the enterprise, and wherein the smart contract comprises a version of the at least one new policy along with a unique policy identifier associated with the at least one new policy, a governance decision of implementing the action, and a timestamp of generating the smart contract; and record the smart contract to the immutable digital database.

4. The system according to claim 1, wherein the at least one action is at least one of: a policy recommendation, a training recommendation.

5. The system according to claim 1, wherein the data repository is further configured to maintain thereat a record of precedent risk cases of the enterprises, and wherein the at least one processor is further configured to:

receive the record of precedent risk cases of enterprises from the data repository;

predict a risk level for the digital governance in the digital ecosystem, based at least upon the violation summary and the at least one policy effectiveness score;

determine the at least one action that is required to be implemented for maintaining or improving the digital governance in the digital ecosystem, based on the risk level; and communicate the at least one action to the target server.

6. The system according to claim 5, wherein the data repository is further configured to store historical and current performance data of the enterprise, the historical and current performance data comprising at least one of: historical and current violation summaries, historical and current policy effectiveness scores, historical and current compliance scores, historical and current governance scores, of the enterprise, and wherein when predicting the risk level for the digital governance in the digital ecosystem, the at least one processor is configured to process the historical and current performance data of the enterprise using at least one predictive modeling technique.

7. The system according to claim 5, wherein the data repository is communicably coupled to a server of at least one regulatory authority, and wherein the data repository is configured to obtain regulations and/or statutes set by industries for the enterprises from the server of at least one regulatory authority and store the regulations and/or statutes in the form of a regulatory library, wherein the regulatory library comprises at least one regulatory document, the at least one regulatory document being used by the enterprises to develop their policies and procedures.

8. The system according to claim 7, wherein the at least one processor is further configured to:

analyze the digital event data to determine the behavior of the digital participants within the digital ecosystem;

generate a recommendation of at least one regulation and/or statute, based at least on the behavior of digital participants; and communicate said recommendation to the server of at least one regulatory authority.

9. The system according to claim 1, wherein the at least one policy document includes at least one fixed policy, the at least one fixed policy being associated with one or more procedures, and wherein when generating the violation summary, the at least one processor is configured to:

extract procedural data from the digital event data;

match the procedural data with reference procedural data associated with the one or more procedures in the at least one fixed policy; and record a given violation in the violation summary when the procedural data partially mismatches or fully mismatches with the reference procedural data, the given violation being a procedural violation.

10. The system according to claim 1, wherein the at least one policy document includes at least one dynamic policy, the at least one dynamic policy being associated with one or more parameters, and wherein when generating the violation summary, the at least one processor is configured to:

extract parametric data from the digital event data;

compare the parametric data with reference parametric values and reference parametric ranges associated with the one or more parameters in the at least one dynamic policy; and record a given violation in the violation summary when the parametric data partially mismatches or fully mismatches with the reference parametric values and/or when the parametric data lies outside of the reference parametric ranges, the given violation being a parametric violation.

11. The system according to claim 1, wherein the at least one violation in the violation summary is at least one parametric violation of a dynamic policy, and wherein when determining the at least one policy effectiveness score, the at least one processor is configured to:

determine a total number of digital events in the parametric data;

determine a number of digital events amongst the total number of digital events that do not result in the at least one parametric violation; and determine a policy effectiveness score of the dynamic policy as the number of digital events amongst the total number of digital events that do not result in the at least one parametric violation divided by the total number of digital events.

12. The system according to claim 1, wherein the data repository is communicably coupled to target servers associated with the enterprises, and wherein the data repository is configured to obtain the policies and procedures used by the enterprises from the target servers and store the policies and procedures in the form of the policy library.

13. The system according to claim 1, wherein the at least one processor is further configured to:

assign a weight to each policy in the at least one policy document, wherein the weight is assigned based on an importance of said policy; and determine at least one weighted policy effectiveness score of each policy in the at least one policy document, wherein a given weighted policy effectiveness score is a product of the weight assigned to said policy and a policy effectiveness score of said policy, and wherein the at least one compliance score of the digital ecosystem is determined based on the at least one weighted policy effectiveness score.

14. A method for managing digital governance in a digital ecosystem, the method comprising:

receiving at least one policy document from a policy library that is maintained at a data repository, wherein the policy library includes policies and procedures used by enterprises, and wherein the at least one policy document is used by an enterprise to which the digital ecosystem belongs;

receiving digital event data from a target server, wherein the digital event data is indicative of behavior of digital participants within the digital ecosystem, and wherein the target server is associated with the enterprise to which the digital ecosystem belongs;

generating a violation summary, based on the at least one policy document and the digital event data, wherein at least one violation is recorded in the violation summary when the digital event data is non-compliant with the at least one policy document;

determining at least one policy effectiveness score, based on the violation summary, wherein the at least one violation in the violation summary is at least one procedural violation of a fixed policy, and wherein the step of determining the at least one policy effectiveness score comprises:

initializing a policy effectiveness score of the fixed policy to a first value, wherein the first value is a maximum score representing a whole;

reducing the first value to a second value by deducting points corresponding to the at least one procedural violation from the maximum score; and determining the policy effectiveness score of the fixed policy as the second value;

determining at least one compliance score, based on the at least one policy effectiveness score;

determining a governance score of the digital ecosystem, based on the at least one compliance score;

timestamping the governance score;

mapping the governance score to a unique digital identifier associated with the enterprise;

recording at least the governance score that is timestamped, along with the unique digital identifier, to an immutable digital database as a proof of governance in the digital ecosystem; and communicating the governance score to the target server, for enabling the enterprise in implementing at least one action for maintaining or improving the digital governance in the digital ecosystem.

15. The method according to claim 14, further comprising:

receiving, from the data repository, at least one new policy document indicative of at least one new policy implemented by the enterprise;

generating a smart contract for enforcing an action of implementing the at least one new policy, wherein the smart contract is linked with the unique digital identifier associated with the enterprise, and wherein the smart contract comprises a version of the at least one new policy along with a unique policy identifier associated with the at least one new policy, a governance decision of implementing the action, and a timestamp of generating the smart contract; and recording the smart contract to the immutable digital database.

16. The method according to claim 14, further comprising:

receiving a record of precedent risk cases of the enterprises;

predicting a risk level for the digital governance in the digital ecosystem, based at least upon the violation summary and the at least one policy effectiveness score;

determining the at least one action that is required to be implemented for maintaining or improving governance in the digital ecosystem, based on the risk level; and communicating the at least one action to the target server.

17. The method according to claim 14, wherein the at least one violation in the violation summary is at least one parametric violation of a dynamic policy, and wherein the step of determining the at least one policy effectiveness score comprises:

determining a total number of digital events in the parametric data;

determining a number of digital events amongst the total number of digital events that do not result in the at least one parametric violation; and determining a policy effectiveness score of the dynamic policy as the number of digital events amongst the total number of digital events that do not result in the at least one parametric violation divided by the total number of digital events.

18. A computer program product comprising a non-transitory machine-readable data storage medium having stored thereon program instructions that, when executed by a processor, cause the processor to:

receive at least one policy document from a policy library that is maintained at a data repository, wherein the policy library includes policies and procedures used by enterprises, and wherein the at least one policy document is used by an enterprise to which the digital ecosystem belongs;

receive digital event data from a target server, wherein the digital event data is indicative of behavior of digital participants within the digital ecosystem, and wherein the target server is associated with the enterprise to which the digital ecosystem belongs;

generate a violation summary, based on the at least one policy document and the digital event data, wherein at least one violation is recorded in the violation summary when the digital event data is non-compliant with the at least one policy document;

determine at least one policy effectiveness score, based on the violation summary, wherein the at least one violation in the violation summary is at least one procedural violation of a fixed policy, and wherein when determining the at least one policy effectiveness score, the at least one processor is configured to:

initialize a policy effectiveness score of the fixed policy to a first value, wherein the first value is a maximum score representing a whole;

reduce the first value to a second value by deducting points corresponding to the at least one procedural violation from the maximum score; and determine the policy effectiveness score of the fixed policy as the second value;

determine at least one compliance score, based on the at least one policy effectiveness score;

determine a governance score of the digital ecosystem, based on the at least one compliance score;

timestamp the governance score;

map the governance score to a unique digital identifier associated with the enterprise;

record at least the governance score that is timestamped, along with the unique digital identifier, to an immutable digital database as a proof of governance in the digital ecosystem; and communicate the governance score to the target server, for enabling the enterprise in implementing at least one action for maintaining or improving the digital governance in the digital ecosystem.

* * * * *